US005865381A

United States Patent [19]

Mitsumura et al.

[11] Patent Number: 5,865,381

[45] Date of Patent: Feb. 2, 1999

[54] SURFACE TREATING APPARATUS FOR SOLID PARTICLES, SURFACE TREATING METHOD THEREFOR AND METHOD FOR PRODUCING TONER

[75] Inventors: Satoshi Mitsumura, Yokohama; Toshinobu Ohnishi; Yoshinori Tsuji, both of Shizuoka-ken, all of Japan

[73] Assignee: Canon Kabushiki Kaisha, Tokyo, Japan

[21] Appl. No.: 902,327

[22] Filed: Jul. 29, 1997

[30] Foreign Application Priority Data

| | | | |
|---|---|---|---|
| Jul. 30, 1996 | [JP] | Japan | 8-215976 |
| Jul. 30, 1996 | [JP] | Japan | 8-215977 |
| Jul. 30, 1996 | [JP] | Japan | 8-215978 |
| Jun. 18, 1997 | [JP] | Japan | 9-160804 |

[51] Int. Cl.[6] .......... B02C 13/00; B02C 13/28

[52] U.S. Cl. .......... 241/18; 241/24.1; 241/27; 241/29; 241/47; 241/56; 241/79.1; 241/162

[58] Field of Search .......... 241/15, 18, 27, 241/29, 24.1, 47, 56, 57, 79.1, 157, 158, 159, 160, 161, 162, 23

[56] References Cited

U.S. PATENT DOCUMENTS

| | | | |
|---|---|---|---|
| 3,488,009 | 1/1970 | Schold | 241/163 |
| 3,807,703 | 4/1974 | Day | 259/7 |
| 4,479,613 | 10/1984 | Rowledge | 241/48 |
| 4,733,826 | 3/1988 | Komori et al. | 241/52 |
| 4,792,238 | 12/1988 | Yoneyama et al. | 366/307 |
| 4,844,349 | 7/1989 | Kanda et al. | 241/19 |
| 5,087,546 | 2/1992 | Kanda et al. | 430/137 |
| 5,637,434 | 6/1997 | Ikushima et al. | 430/137 |
| 5,695,130 | 12/1997 | Csendes | 241/19 |
| 5,732,894 | 3/1998 | Sheahan | 241/56 |

FOREIGN PATENT DOCUMENTS

| | | |
|---|---|---|
| 36-10231 | 7/1961 | Japan . |
| 42-27021 | 12/1967 | Japan . |
| 56-13945 | 4/1981 | Japan . |
| 59-53856 | 3/1984 | Japan . |
| 59-61842 | 4/1984 | Japan . |
| 62-83029 | 4/1987 | Japan . |
| 3-56131 | 3/1991 | Japan . |
| 7-244399 | 9/1995 | Japan . |

OTHER PUBLICATIONS

Tanaka et al.; "Powder Surface Modification . . . and Application", Zairyo Gijutsu, vol. 8, No. 8, pp. 274–286, Oct. 1990.

*Primary Examiner*—John M. Husar
*Attorney, Agent, or Firm*—Fitzpatrick, Cella, Harper & Scinto

[57] ABSTRACT

An apparatus for treating the surfaces of solid particles has at least a first cylindrical treating chamber and a rotary shaft and a first rotor having two or more blades on its front face, contained in the first cylindrical treating chamber. A powder charging aperture for introducing the solid particles into the first cylindrical treating chamber together with gas is provided at the center of the front wall of the first cylindrical treating chamber, opposed to the front face of the first rotor. A first powder discharging aperture for discharging the treated solid particles is provided at the center of the rear wall of the first cylindrical treating chamber, opposed to the rear face of the first rotor. The first rotor is connected with the rotary shaft and rotated by the rotation of the rotary shaft. The height $H_a$ of the blades, the gap $L_{1a}$ between the tip of each of the blades and the front wall, the largest diameter $R_{1a}$ of the first rotor and the gap $L_{2a}$ between the blades and the sidewall of the first cylindrical treating chamber satisfy the following conditions:

$$0.1 \leq L_{1a}/H_a \leq 5.0,\ 50\times10^{-3} \leq H_a/R_{1a} \leq 400\times10^{-3} \text{ and } 1.0\times10^{-3} \leq L_{2a}/R_{1a} \leq 95\times10^{-3}.$$

88 Claims, 17 Drawing Sheets

SURFACE TREATING APPARATUS FOR SOLID PARTICLES, SURFACE TREATING METHOD THEREFOR AND METHOD FOR PRODUCING TONER

BACKGROUND OF THE INVENTION

1. Field of the Invention

The present invention relates to a surface treating apparatus for solid particles, a surface treating method therefor and a method for producing toner for developing an electrostatic charge image.

2. Related Background Art

Various methods for surface treatment of solid particles and powder treating apparatus have already been proposed. For example, powder treating apparatus of impact type utilizing a rotary blade and powder treating apparatus utilizing heat treatment are already known. The powder treating apparatus of impact type utilizing the rotary blade is described in Y. Takayama, Y. Kikuchi and K. Ono: "Zairyo Gijutsu" Vol. 8, No. 8, 10 (1990). There have been proposed methods for treating the surfaces of powder particles (as described in Japanese Patent Publication No. 42-27021 and Japanese Patent Application Laid-Open No. 7-244399), the method utilizing a hybridization system described in the Japanese Patent Application Laid-Open No. 62-83029 and already put on the market by Nara Kikai Co., Ltd., or an impact pulverizer described in Japanese Patent Publication No. 42-27021 and put on the market by Turbo Kogyo Co., Ltd.

In the hybridization system, for example, a treating apparatus as illustrated in FIGS. 12, 13 and 14 is used, wherein a casing 151, a stator 158, a stator jacket 177, a recycling valve 163, a discharge valve 159, a discharge valve 119 and a raw material charging chute 164 are shown.

In this apparatus, the powder particles and other fine solid particles charged from the raw material charging chute 164 are subjected, in an impact chamber 168, to instantaneous impact by two or more rotor blades 155 provided on a rotor 162 rotated at a high speed, and collide with a peripheral stator 158 to disperse in the system while breaking up agglomeration of the powder particles and the other fine solid particles, whereby the other fine solid particles are adhered onto the surface of the powder particles by electrostatic force or Van Der Waals force or, in case the powder particles alone are charged, such particles are subjected to rounding and formation of spherical particles. Such process proceeds with the flight and collision of the particles. Thus the particles are treated by plural passages through the recycle pipe 163, along the air flow caused by the rotation of the rotor blades 155. In addition, through the repeated impacts given by the rotor blades 155 and the stator 158, the other fine solid particles are uniformly dispersed and fixed on the surfaces, or the vicinity thereof, of the powder particles or, in case the powder particles alone are charged, the particles are shaped into a spherical form.

After such fine particle fixation, the particles are discharged through a discharge valve 159, controlled by a discharge valve control device 128, and a discharge chute 119 and collected by a bag filter 122 connected with a suction blower 124.

However such conventional powder treating apparatus requires the operation for a prolonged period, because the surface treatment of the powder particles is effected by the rotor blades 155 rotating at a high speed, utilizing the recycle pipe 163. Such operation may involve excessive collisions of the particles, leading to heat generation in the powder and eventually to denaturing thereof. In such apparatus, in order to achieve uniform surface treatment it is necessary to charge a predetermined amount of powder in a certain given volume and to execute a prolonged treatment ranging from several tens of seconds to several minutes. In such operation, because of the prolonged process time and of the high concentration of powder dust, re-agglomeration of the dispersed particles may occur in the course of surface treatment or the formation of fused solid matter may be formed by the generated heat.

The powder treating apparatus as shown in FIGS. 12 to 14, being a batch system, is incapable of continuous processing. For this reason, accessory equipment such as a weighing machine for weighing and charging a predetermined amount of the powder material into the treating apparatus, is required. Consequently such apparatus has been associated with drawbacks such as a high production cost and a narrow tolerance for the stable manufacturing operation.

Such drawbacks tend to become particularly conspicuous in the surface treatment of the solid toner particles for producing a toner used for developing an electrostatic charge image in a copying machine or in a printer.

Since, in general, various different properties are required for a toner, the characteristics of the toner are often affected by its producing method, in addition to raw materials used therefor. In the surface treating process of toner particles, it is required to produce toner particles with satisfactory quality in an efficient and stable manner at a low cost.

A binder resin used for toner particles is generally composed of a resinous material having a low melting point, a low softening point or a low glass transition point, and the toner particles containing such resinous material tends to cause fusing or adhesion to the surface treating apparatus in the surface treatment process.

On the other hand, for energy saving in the copying machine utilizing toner fixation with heat and pressure, binder resins having a low glass transition point or a low softening point came into use in order to achieve toner fixation with a lower electric powder consumption and at a lower temperature.

Besides, there is a tendency for the size of toner particles to be gradually made smaller in order to improve image quality in copying machines and printers. In general, the smaller the solid particles are, the larger the force between the particles is. Similarly, as the resin particles or the toner particles are made smaller, the agglomeration of the particles is more easily brought about.

As a treating apparatus of a continuous processing type using an impact pulverizer, an apparatus as shown in FIGS. 15, 16 and 17 is proposed, which is provided with a cylindrical casing and a rotor 214 having a distributor 220 which is positioned in the casing concentrically with the axis of the casing. A liner 210 set on the internal periphery of the casing 201 is provided with plural grooves in the direction of the rotary shaft 215. The rotor 214 is provided with plural blades 221 made of an abrasion resistance metal and powder material is treated in a treating area 213.

On the upstream side of the casing 201, an inlet 211 for the powder raw material charged through a constant-rate feeder 240 and a vibration feeder 215 and for the incoming air, and a spiral chamber 212 are provided. On the downstream side of the inlet 211, a discharge opening 202 is provided, which is connected to a cyclone dust collector 229 or a bag filter 222 communicating with a suction blower 224.

An example of such apparatus is the Turbo Mill crusher manufactured by Turbo Kogyo Co., Ltd.

However such apparatus tends to form particles which are subjected to uneven surface treatment. In addition, even when using cold air flow or a heater and regulating the revolution of the rotor to adjust the level of surface treatment, grinding or re-agglomeration of the solid particles is liable to occur so that the stable surface treatment of the solid particles has been difficult to achieve.

Furthermore, Japanese Patent Application Laid-Open No. 3-56131 (corresponding to U.S. Pat. No. 5,087,546) discloses a continuous mixing apparatus as shown in FIGS. 18 to 22 and a method for producing toner utilizing such apparatus. The apparatus is provided with a cylindrical casing 301, and agitating blades 302 connected to a rotor shaft 304 and fixed blades 303, both set in the casing 301. A disk 313 of the agitating blades 302 is provided with plural blades 312, while annular fixed disk 315 of the fixed blades 303 is provided with plural blades 314.

On the upstream side of the cylindrical casing 301, an inlet 305 for the powder raw material charged through a raw material hopper 307 and a vibration feeder 308 and for the incoming air is formed. On the downstream side of the inlet 305, a discharge opening 306 is provided, which is connected to an external collecting cyclone 309 or a bag filter 310 communicating with a suction blower 311. Such apparatus is used as a continuous mixing apparatus.

However, further improvements have been desired on such apparatus, since it is weak in the impact force of the solid particles against the peripheral wall because of a wide gap between the agitating blades 302 and the side wall of the apparatus, and tends to produce solid particles with uneven surface treatment.

SUMMARY OF THE INVENTION

An object of the present invention is to provide a surface treating apparatus for solid particles, a surface treating method for solid particles, and a method for producing a toner in which the surface treating apparatus is used to treat the surfaces of solid toner particles, which are free from the aforementioned drawbacks.

Another object of the present invention is to provide an apparatus and a method enabling efficient surface treatment of solid particles.

Still another object of the present invention is to provide an apparatus and a method enabling uniform surface treatment of solid particles.

Still another object of the present invention is to provide a surface treating apparatus for solid particles, in which fusing of the particles is hard to bring about inside the apparatus.

Still another object of the present invention is to provide a surface treating apparatus and a surface treating method for solid particles, capable of controlling the formation of coarse agglomerates of the particles.

Still another object of the present invention is to provide a surface treating apparatus and a surface treating method for solid particles, enabling efficient adhesion and/or deposition of the solid particles onto the surfaces of solid matrix particles.

Still another object of the present invention is to provide a surface treating apparatus and a surface treating method, in which the surfaces of solid particles can be treated in an inexpensive and efficient manner.

Still another object of the present invention is to provide a surface treating apparatus and a surface treating method for solid particles, capable of efficiently reducing a shape factor SF-1 of the solid particles.

Still another object of the present invention is to provide a method for producing a toner for developing an electrostatic charge image, excellent in developing and transferring properties.

Still another object of the present invention is to provide a method for producing a toner with a small shape factor SF-1, from solid toner particles with undefined shapes.

Still another object of the present invention is to provide an apparatus for treating the surfaces of solid particles, comprising, at least:

a first cylindrical treating chamber; and a rotary shaft and a first rotor having two or more blades on its front face, contained in the first cylindrical treating chamber;

wherein a powder charging aperture for introducing the solid particles into the first cylindrical treating chamber together with gas is provided at the center of a front wall of the first cylindrical treating chamber, opposed to the front face of the first rotor;

a first powder discharging aperture for discharging the treated solid particles is provided at the center of a rear wall of the first cylindrical treating chamber, opposed to the rear face of the first rotor;

the first rotor is connected with the rotary shaft and can be rotated by rotation of the rotary shaft; and a height $H_a$ of the blades, a gap $L_{1a}$ between the tip of each of the blades and the front wall, the largest diameter $R_{1a}$ of the first rotor and a gap $L_{2a}$ between the blades and a sidewall of the first cylindrical treating chamber satisfy the following conditions:

$$0.1 \leqq L_{1a}/H_a \leqq 5.0,\ 50\times10^{-3} \leqq H_a/R_{1a} \leqq 400\times10^{-3} \text{ and } 1.0\times10^{-3} \leqq L_{2a}/R_{1a} \leqq 95\times10^{-3}.$$

Still another object of the present invention is to provide a method for treating the surfaces of solid particles, comprising the steps of:

using a surface treating apparatus which comprises, at least:

a first cylindrical treating chamber; and a rotary shaft and a first rotor having two or more blades at its front face, contained in the first cylindrical treating chamber;

wherein a height $H_a$ of the blades, a gap $L_{1a}$ between the tip of each of the blades and a front wall, the largest diameter $R_{1a}$ of the first rotor and a gap $L_{2a}$ between the blades and a sidewall of the first cylindrical treating chamber satisfy the following conditions:

$$0.1 \leqq L_{1a}/H_a \leqq 5.0,\ 50\times10^{-3} \leqq H_a/R_{1a} \leqq 400\times10^{-3} \text{ and } 1.0\times10^{-3} \leqq L_{2a}/R_{1a} \leqq 95\times10^{-3};$$

rotating the first rotor by driving the rotary shaft;

introducing the solid particles together with gas into the first cylindrical treating chamber through a powder charging aperture provided at the center of a front wall of the first cylindrical treating chamber;

treating the surface of the solid particles by applying mechanical impact force thereto while retaining the solid particles in the first cylindrical treating chamber; and discharging the treated solid particles from a powder discharging aperture provided at the center of a rear wall of the first cylindrical treating chamber opposed to the rear face of the first rotor.

Still another object of the present invention is to provide a method for treating the surfaces of solid particles, in which a surface treating apparatus is used to adhere and/or fix, onto the surface of solid mother particles, solid daughter particles smaller than the solid mother particles, wherein the surface treating apparatus comprises, at least:

a first cylindrical treating chamber; and a rotary shaft and a first rotor having two or more blades on its front face, contained in the first cylindrical treating chamber;

wherein a height $H_a$ of the blades, a gap $L_{1a}$ between the tip of each of the blades and a front wall, the largest diameter $R_{1a}$ of the first rotor and a gap $L_{2a}$ between the blades and a sidewall of the first cylindrical treating chamber satisfy the following conditions:

$$0.1 \leqq L_{1a}/H_a \leqq 5.0,\ 50\times10^{-3} \leqq H_a/R_{1a} \leqq 400\times10^{-3} \text{ and } 1.0\times10^{-3} \leqq L_{2a}/R_{1a} \leqq 95\times10^{-3};$$

rotating the first rotor by driving the rotary shaft;

introducing the solid mother particles and the solid daughter particles together with gas into the first cylindrical treating chamber through a powder charging aperture provided at the center of a front wall of the first cylindrical treating chamber;

adhering and/or fixing the solid daughter particles onto the surface of the solid mother particles by applying mechanical impact force thereto while retaining the solid mother particles and the solid daughter particles in the first cylindrical treating chamber; and discharging the treated solid matrix particles from a powder discharging aperture provided at the center of a first rear wall of the first cylindrical treating chamber opposed to the rear face of the first rotor.

Still another object of the present invention is to provide a method for treating the surface of solid particles, in which a surface treating apparatus is used to adhere and/or fix, onto the surface of solid mother particles, thermoplastic solid daughter particles smaller than the solid matrix particles, thereby forming films derived from the solid daughter particles on the surfaces of the solid mother particles, wherein the surface treating apparatus comprises, at least:

a first cylindrical treating chamber; and a rotary shaft and a first rotor having two or more blades at the front face thereof, contained in the first cylindrical treating chamber;

wherein a height $H_a$ of the blades, a gap $L_{1a}$ between the tip of each of the blades and a front wall, the largest diameter $R_{1a}$ of the first rotor and a gap $L_{2a}$ between the blades and a sidewall of the first cylindrical treating chamber satisfy the following conditions:

$$0.1 \leqq L_{1a}/H_a \leqq 5.0,\ 50\times10^{-3} \leqq H_a/R_{1a} \leqq 400\times10^{-3} \text{ and } 1.0\times10^{-3} \leqq L_{2a}/R_{1a} \leqq 95\times10^{-3};$$

rotating the first rotor by driving the rotary shaft;

introducing the solid mother particles and the solid daughter particles together with gas into the first cylindrical treating chamber through a powder charging aperture provided at the center of a front wall of the first cylindrical treating chamber;

applying mechanical impact force and heat to the solid mother particles and the solid daughter particles while retaining the solid mother particles and the solid daughter particles in the first cylindrical treating chamber, thereby crushing the solid daughter particles and forming films derived therefrom on the surfaces of the solid mother particles; and discharging the treated solid mother particles from a powder discharging aperture provided at the center of a first rear wall of the first cylindrical treating chamber opposed to the rear face of the first rotor.

Still another object of the present invention is to provide a method for producing toner, in which a surface treating apparatus is used to treat the surfaces of solid toner particles containing at least a binder resin and a coloring material, producing a toner from the treated solid toner particles, wherein the surface treating apparatus comprises, at least:

a first cylindrical treating chamber; and a rotary shaft and a first rotor having plural blades at the front face thereof, contained in the first cylindrical treating chamber;

wherein a height $H_a$ of the blades, a gap $L_{1a}$ between the tip of the blades and a front wall, the largest diameter $R_{1a}$ of the first rotor and a gap $L_{2a}$ between the blades and a sidewall of the first cylindrical treating chamber satisfy the following conditions:

$$0.1 \leqq L_{1a}/H_a \leqq 5.0,\ 50\times10^{-3} \leqq H_a/R_{1a} \leqq 400\times10^{-3} \text{ and } 1.0\times10^{-3} \leqq L_{2a}/R_{1a} \leqq 95\times10^{-3};$$

rotating the first rotor by driving the rotary shaft;

introducing the solid toner particles together with gas into the first cylindrical treating chamber through a powder charging aperture provided at the center of a front wall of the first cylindrical treating chamber;

treating the surface of the solid toner particles by applying mechanical impact force thereto while retaining the solid toner particles in the first cylindrical treating chamber; and discharging the treated solid toner particles from a first powder discharging aperture provided at the center of a first rear wall of the first cylindrical treating chamber opposed to the rear face of the first rotor.

DETAILED DESCRIPTION OF THE PREFERRED EMBODIMENTS

Figure 1:
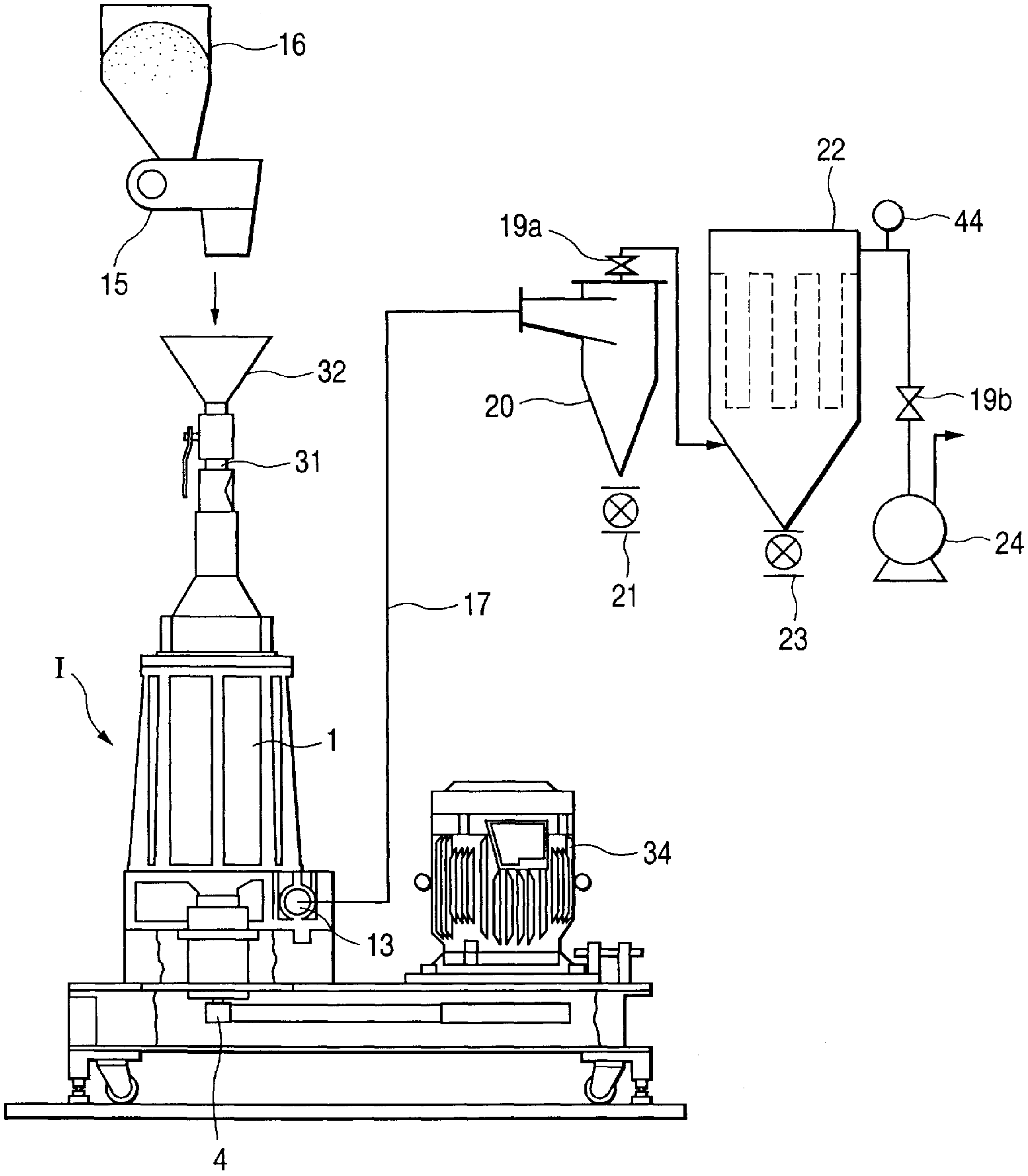
FIG. 1 is a schematic external view of a system having an example of the surface treating apparatus of a vertical type of the present invention.

The surface treating apparatus of the present invention for solid particles can be used as a modifying apparatus for solid particles with large shape factors SF-1 and SF-2, for the purpose of reducing such shape factors by applying a mechanical impact force to such solid particles and rubbing their surfaces without destruction thereof. According to such surface treatment, the solid particles come to have a spherical form or a form close thereto, and show improved flowability.

The shape factors SF-1 and SF-2 of the solid particles, for example toner particles, are defined in the following manner.

For example, using FE-SEM (S-800) manufactured by Hitachi, Ltd. as a measuring apparatus, 100 images of solid particles of 2 μm or larger, magnified 1000 times, are sampled at random and the obtained image information is supplied to, and analyzed in, an image analyzing apparatus (Luzex 111 manufactured by Nicoret Co.) in which the shape factors SF-1 and SF-2 are defined according to the following equations:

$$\text{SF-1}=(MXLNG)^2/\text{AREA}\times\pi/4\times100$$

$$\text{SF-2}=(PERIME)^2/\text{AREA}\times1/4\pi\times100$$

wherein MXLNG is the absolute maximum length of the solid particle, PERIME is the circumferential length of the solid particle, and AREA is the projected area of the solid particle.

The shape factor SF-1 represents the roundness of a solid particle, and the shape factor SF-2 represents the level of the surface irregularity of a solid particle. For an ideal sphere with a smooth surface, the shape factors SF-1 and SF-2 are both 100.

For the solid particles having the shape factor SF-1 of 150 to 180 and the shape factor SF-2 of 140 to 160 prior to the treatment, the treating apparatus of the present invention can reduce the shape factor SF-1 by 20 or more into a range of 130 to 160, and also can reduce the shape factor SF-2 by 10 or more into a range of 110 to 150.

For realizing uniform surface treatment, the solid particles preferably have a weight-averaged particle size within a range of 2.5 to 20 μm, more preferably 3.0 to 15 μm.

The particle size distribution, the weight-averaged particle size and the volume-averaged particle size of the solid particles or the toner particles are measured by the following methods.

As a measuring apparatus, the Coulter Counter TA-II or the Coulter Multisizer-II (manufactured by Coulter Inc.) is employed. The electrolyte employed is 1% NaCl aqueous solution prepared with first grade sodium chloride. For example, ISOTONR-II (supplied by Coulter Scientific Japan Co.) can be employed for this purpose. To 100 to 150 ml of the above-mentioned electrolyte solution is added 0.1 to 5 ml of a surfactant (preferably alkylbenzenesulfonate) and 2 to 20 mg of the sample to be measured. The electrolyte solution in which the sample is suspended is subjected to dispersion for 1 to 3 minutes with an ultrasonic dispersing apparatus, and then the volume and the number of the solid particles are measured using the above-mentioned measuring apparatus with a 100 μm aperture to determine the volume distribution and the number distribution.

The weight-averaged particle size and the volume-averaged particle size are calculated from the measured volume distribution of the solid particles. In the measurements, the center value of each channel is taken as the representative value thereof.

The treating apparatus of the present invention can also be employed as an apparatus for external addition of solid daughter particles to solid mother particles by adhering onto the surfaces of solid mother particles solid daughter particles smaller than the solid mother particles. For realizing uniform external addition, the solid mother particles have preferably a weight-averaged particle size within a range of 2.5 to 20 μm, more preferably 3.0 to 15 μm. The solid daughter particles have preferably a particle size not exceeding ⅕, more preferably not exceeding 1/10, of that of the solid matrix particles.

Further, the treating apparatus of the present invention can also be employed as a modifying apparatus for fixing or implanting onto the surfaces of solid mother particles solid daughter particles smaller than the solid mother particles, thereby modifying the surface of the solid mother particles with the solid daughter particles. In such case, the solid matrix particles have preferably a weight-averaged particle size within a range of 2.5 to 20 μm, more preferably 3.0 to 15 μm. Also the solid daughter particles have preferably a particle size not exceeding ⅕, more preferably not exceeding 1/10, of that of the solid mother particles.

Furthermore, the treating apparatus of the present invention can also be employed as a dry encapsulating apparatus by adhering and/or fixing onto the surfaces of solid mother particles thermoplastic solid daughter particles smaller than the solid matrix particles, and crushing the solid daughter particles under the application of a mechanical impact force and heat to the solid matrix particles and the solid daughter particles, thereby forming a film derived from the solid daughter particles on the surface of each of the solid matrix particles. For forming the films on the surfaces of the solid mother particles, the solid matrix particles have preferably a weight-averaged particle size within a range of 2.5 to 20 μm, more preferably 3.0 to 15 μm. In this case, the solid daughter particles preferably have a particle size not exceeding ⅕, more preferably not exceeding 1/10, of that of the solid mother particles. In addition, the solid daughter particles are composed of a resinous material having preferably the glass transition point within a range of 50° C. to 100° C., more preferably 55° C. to 95° C.

Furthermore, the treating apparatus of the present invention can also be employed as a modifying apparatus for treating the surfaces of toner particles containing at least a binder resin and a coloring material, thereby modifying the surfaces of such toner particles. For example, when producing solid toner particles by fusing and kneading a binder resin and a coloring material, cooling the kneaded material and pulverising and classifying the material, the toner particles thus obtained can be treated with the treating apparatus of the present invention to reduce the shape factors SF-1 and SF-2, thereby improving the developing performance and the transfer performance of such solid toner particles.

The surface treating apparatus of the present invention for the solid particles will be more concretely described below with reference to the attached drawings.

Figure 2:
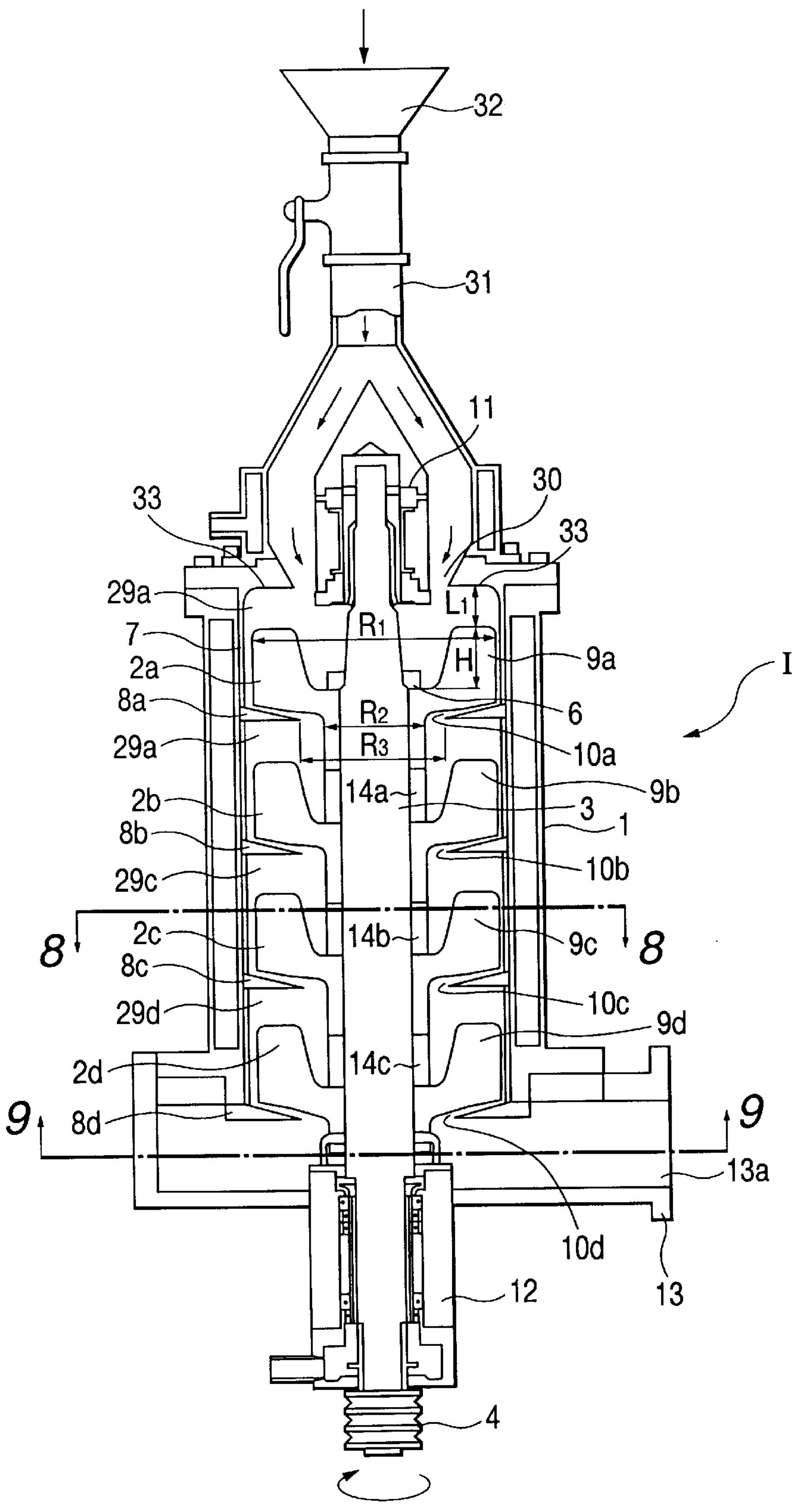
FIG. 2 is a schematic cross-sectional view of the surface treating apparatus of a vertical type of the present invention.
Figure 3:
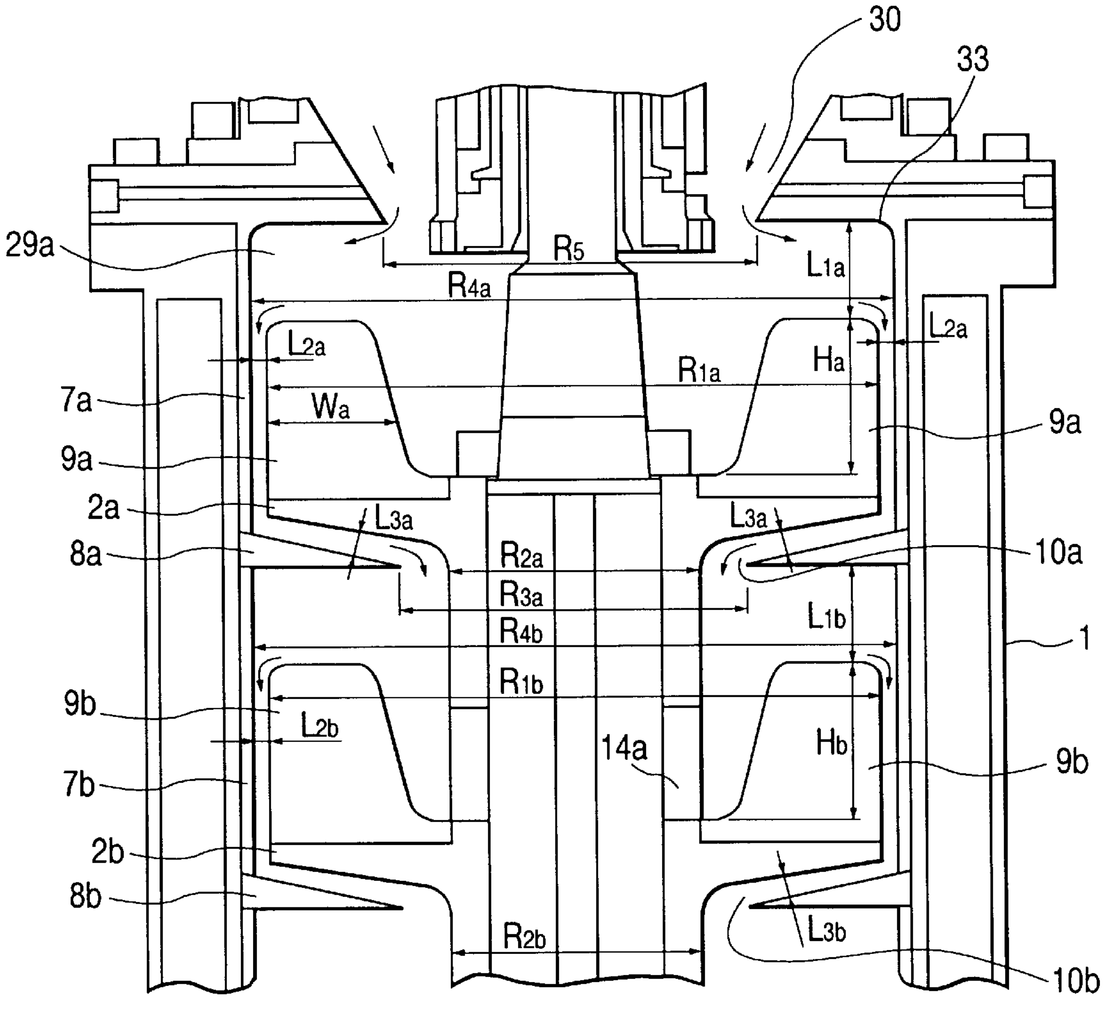
FIG. 3 is a schematic magnified partial cross-sectional view of the surface treating apparatus of vertical type of the present invention.

FIG. 1 illustrates an example of the surface treating system having a treating apparatus I of the present invention, FIG. 2 is a partial cross-sectional view of the treating apparatus I, and FIG. 3 is a partial magnified cross-sectional view of the treating apparatus I.

Figure 7:
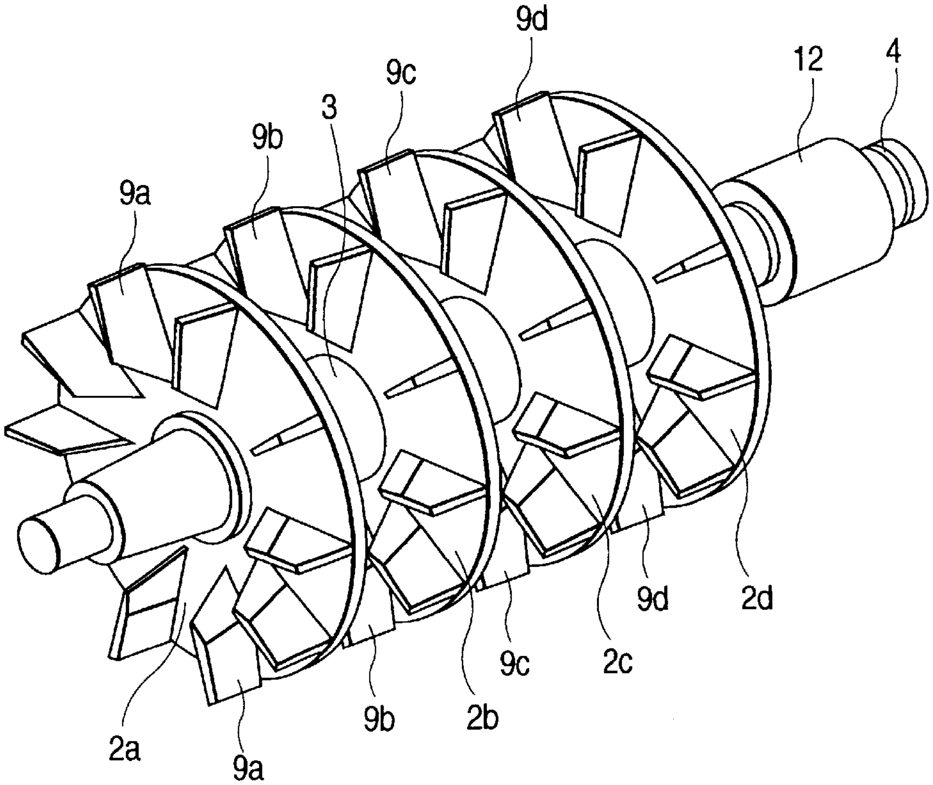
FIG. 7 is a perspective view of a rotary shaft on which the rotors are mounted.
Figure 8:
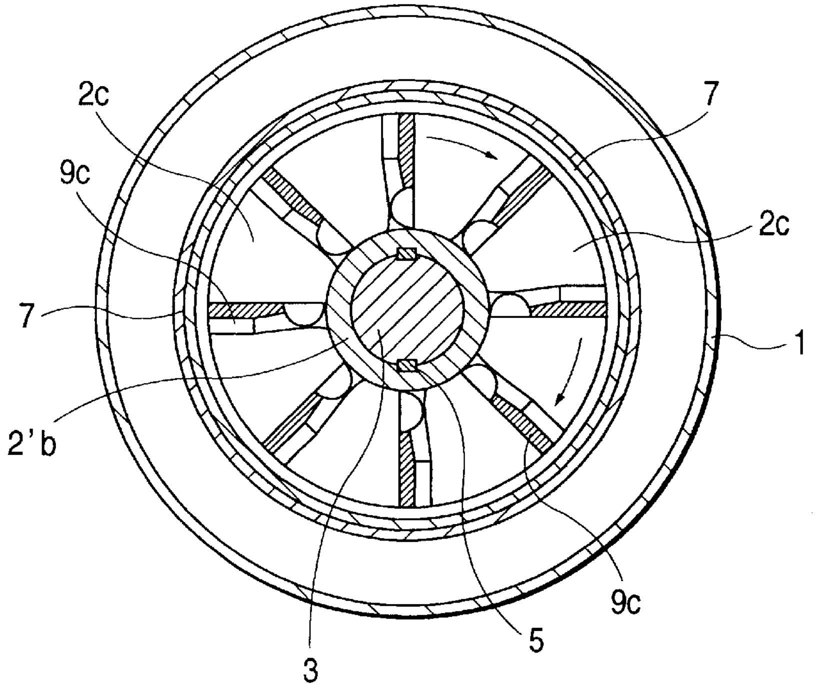
FIG. 8 is a cross-sectional view taken along the line 8—8 shown in FIG. 2.

The treating apparatus I shown in FIG. 2 is provided, in a cylindrical casing 1, with first to fourth cylindrical treating chambers 29*a*–29*d* in succession, which respectively include rotors 2*a*, 2*b*, 2*c*, 2*d* each having 8 blades and fixed on a rotary driving shaft 3 by means of keys 5 (cf. FIG. 8). The rotors 2*a*–2*d* are rotated clockwise by the rotary shaft 3, which is rotatably supported by bearings 11, 12 and rotated at a high speed by a motor 34 through a belt and a pulley 4 at the lower end. FIG. 7 is a perspective view of the rotary driving shaft having 4 rotors. The rotors 2*a*–2*d* are rotated according to the rotation of the rotary shaft 3 to which the rotors are connected.

Figure 9:
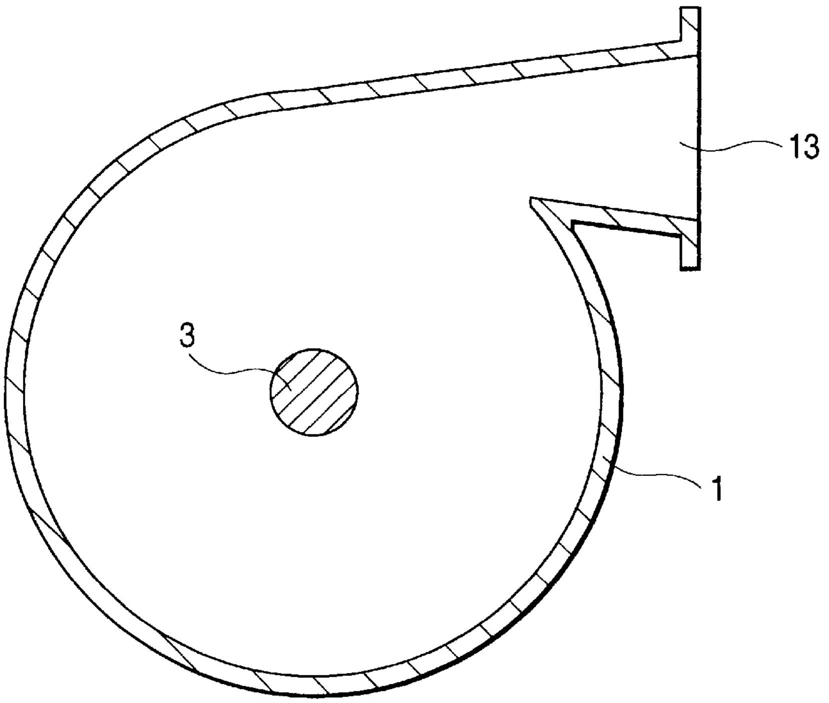
FIG. 9 is a cross-sectional view taken along the line 9—9 shown in FIG. 2.

The solid particles contained in a constant-rate feeding apparatus 16, shown in FIG. 2, are supplied through a vibration feeder 15, a hopper 32 and a powder supply tube 31 into the first cylindrical treating chamber 29*a*, together with air, by the suction force of a suction blower 24, through a powder charging aperture 30 provided at the center of a front wall 33 of the first cylindrical treating chamber 29*a*. The solid particles introduced into the first cylindrical treating chamber 29*a* collide with a sidewall 7*a* thereof by an air flow from the center to the sidewall 7*a* generated by the rotation of the rotor 2*a* bearing 8 blades, whereby the solid particles are subjected to surface treatment. The solid particles are subjected to the surface treatment in the course of flow in the space of the first cylindrical treating chamber, and gradually pass through a gap between the sidewall 7*a* and the blades 9*a* and a gap between the rear face of the rotor 2*a* and a first rear wall 8*a* (also called "guide plate 8*a*" or "second front wall 33*b*") and discharged through a first powder discharging aperture 10*a* provided at the center of the first rear wall 8*a*. In the treating apparatus I, the first powder discharging aperture 10*a* constitutes the powder charging aperture of the second cylindrical treating chamber 29*b*, whereby the solid particles are introduced through the first powder discharging aperture 10*a* into the center of the second cylindrical treating chamber 29*b*. The solid particles already subjected to the surface treatment in the first cylindrical treating chamber 29*a* are further subjected to surface treatment by the rotation of the rotor 2*b* having 8 blades in the same manner as in the first cylindrical treating chamber 29*a*. After the surface treatment in the second cylindrical treating chamber 29*b*, the solid particles are further surface-treated in the third and fourth cylindrical treating chambers 29*c*, 29*d*. FIGS. 8 and 9 are cross-sectional views respectively along the lines 8—8 and 9—9 shown in FIG. 2.

After the surface treatment in the fourth cylindrical treating chamber 29*d*, the solid particles are discharged through a fourth powder discharging aperture 10*d* provided at the center of a guide plate 8*d*, a discharging aperture 13*a* of a discharge pipe 13 provided in the tangential direction of the cylindrical casing 1 and a connecting tube 17, and are collected and stored in a cyclone 20. The surface treated solid particles, contained in the cyclone 20, are conveniently taken out from a valve 21. The sidewall 7*a*–7*d* of the treating apparatus I are preferably free from surface irregularities when effecting surface treatment for reducing the shape factor SF-1 of the solid particles.

The treating apparatus I, the cyclone 20, the bag filter 22 and the suction blower 24 mutually communicate through communication means such as a pipe. The suction amount of the suction blower 24 can be regulated with valves 19*a*, 19*d* under the observation of the flow rate with a flow meter 44. The fine powder contained in the bag filter 22 is conveniently taken out through a valve 23.

It is preferable to adjust the temperature in the cylindrical treating chambers, by providing the cylindrical casing 1 with a jacket structure and supplying cooling water, hot water or heating steam in the jacket.

In the first cylindrical treating chamber 29*a*, the height $H_a$ of the blades 9*a* integrated to the first rotor 2*a* to form a single entity, the gap $L_{1a}$ between the tip of the blades 9*a* and the front wall 33, the largest diameter $R_{1a}$ of the first rotor 2*a* and the gap $L_2a$ between the blades 9*a* and the sidewall 7*a* of the first cylindrical treating chamber 2*a* satisfy the following conditions:

$$0.1 \leqq L_{1a}/H_a \leqq 5.0,\ 50\times10^{-3} \leqq H_a/R_{1a} \leqq 400\times10^{-3} \text{ and } 0.1\times10^{-3} \leqq L_{2a}/R_{1a} \leqq 95\times10^{-3}.$$

The ratio $L_{2a}/R_{1a}$ is preferably within a range from $1.5\times10^{-3}$ to $85.0\times10^{-3}$, more preferably from $2.0\times10^{-3}$ to $80.0\times10^{-3}$. Under these conditions, the uniform and efficient surface treatment can be applied to the solid particles, since the solid particles efficiently receive the mechanical impact force by the blades 9*a* and the sidewall 7*a* in the first cylindrical treating chamber 29*a* and have a prolonged detention time by circulating in the first cylindrical treating chamber 29*a*.

For more efficient surface treatment, $H_a$ is preferably within a range from 10.0 to 500.0 mm, more preferably from 20.0 to 400.0 mm; $L_{1a}$ is preferably within a range from 1 to 300, more preferably from 5 to 200 mm; $R_{1a}$ is preferably within a range from 100 to 2000 mm, more preferably from 150 to 1000 mm; and $L_2a$ is preferably within a range from 1.0 to 15.0 mm, more preferably from 1.0 to 10.0 mm.

Figure 4:
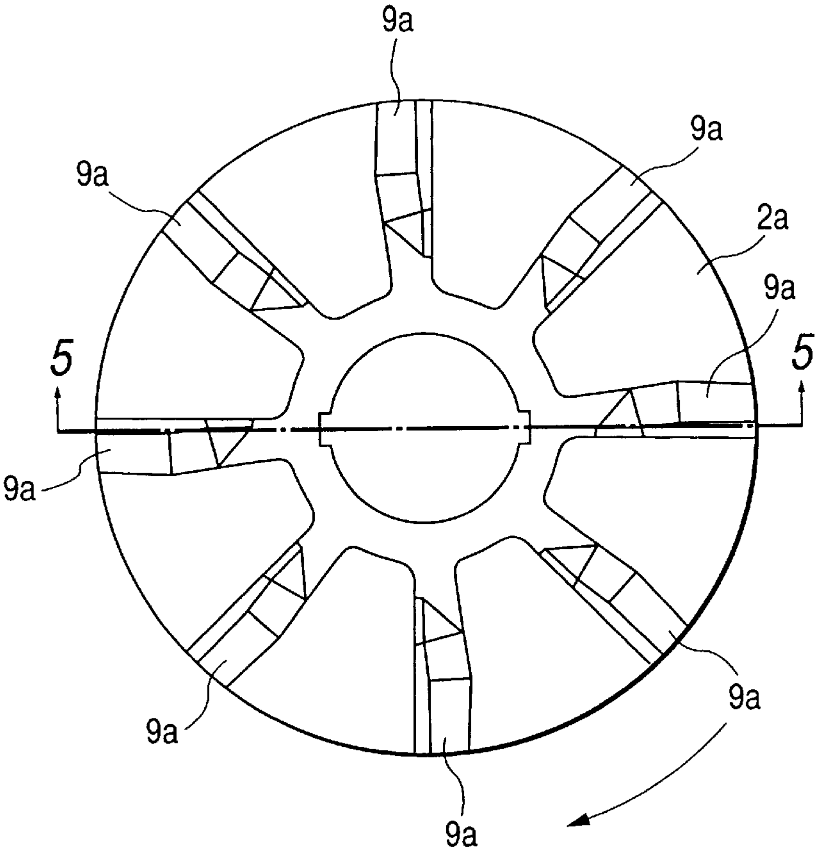
FIG. 4 is a plan view of a rotor.
Figure 5:
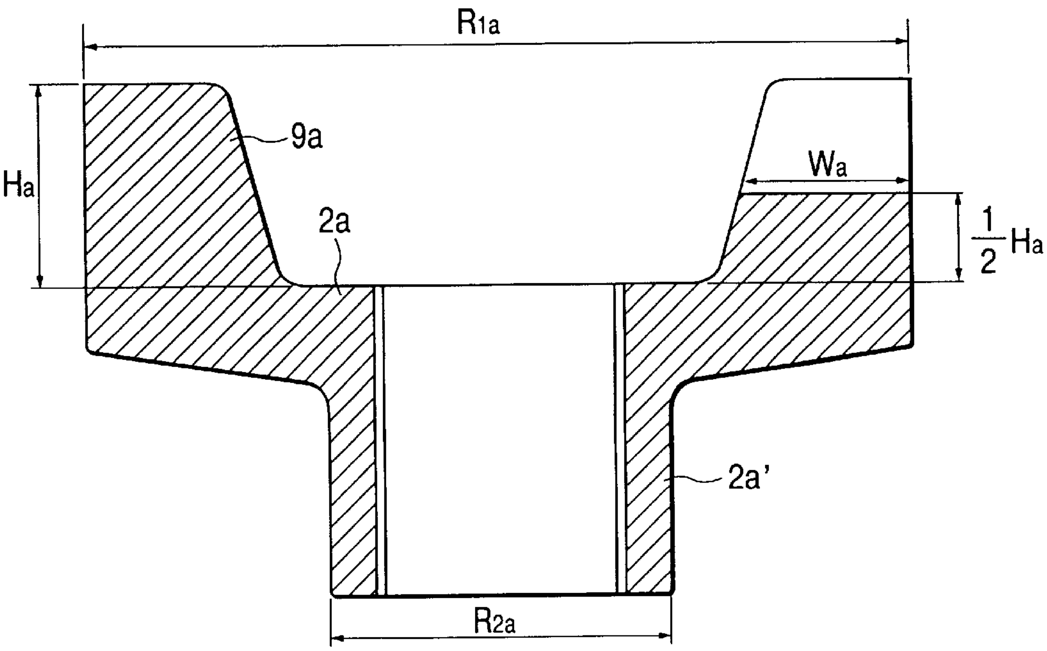
FIG. 5 is a cross-sectional view of the rotor taken along the line 5—5 shown in FIG. 4.
Figure 6:
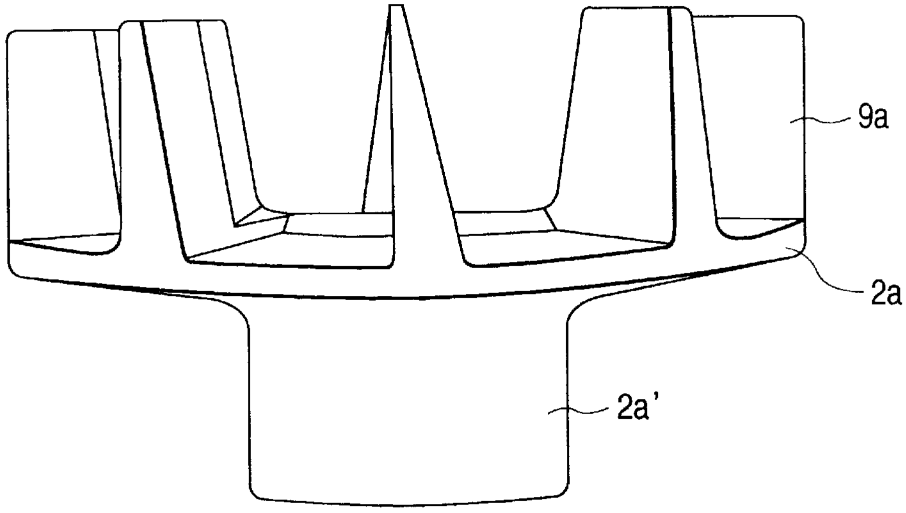
FIG. 6 is a perspective view of the rotor.

In order to efficiently carry out the surface treatment of solid particles, the first rotor 2*a* is preferably provided with 2 to 32 blades, more preferably 4 to 16 blades. FIG. 4 is a plan view of the rotor 2*a* having 8 blades 9*a* radially and integrally formed thereon at an approximately equal intervals, FIG. 5 shows a cross section of the rotor taken along the line 5—5 as represented by hatched areas, and FIG. 6 is a perspective view of the rotor. The rotor 2*a* is provided with a boss portion 2*a*' for increasing the connectability with the rotary shaft 3. In order to prolong the detention time of the solid particles and to efficiently generate the mechanical impact force to the solid particles by the sidewall, the height $H_a$ of the blades of the rotor 2*a* is preferably larger than the half-value width $W_a$ of the blades, and more preferably 1.1 to 2.0 times as large as $W_a$.

In order to prolong the stay time of the solid particles, it is preferable that the internal volume $V_a$ of the first cylindrical treating chamber 29*a* is within a range from $1\times10^3$ to $4\times10^6$ $cm^3$, the area $S_a$ of each blade 9*a* is within a range from 10 to 300 $cm^2$ and the half-value width $W_a$ of the blade 9*a* is within a range from 10 to 300 mm.

For achieving efficient surface treatment, it is preferable that in the first cylindrical treating chamber 29*a*, the largest diameter $R_{4a}$ is within a range from 100.5 to 2020 mm, the largest diameter of the powder charging aperture 30 is within a range from 50 to 500 mm, and the largest diameter $R_{3a}$ of the first powder discharging aperture 10*a* is within a range from 50 to 500 mm, and that the largest diameter $R_{2a}$ of the boss portion 2*a*' of the rotor 2*a* is within a range from 30 to 450 mm.

The gap $L_{3a}$ between the rear face of the rotor 2*a* and the first rear wall 8*a* can be adjusted by varying the height of a spacer 14. The level of surface treatment of the solid particles in the first cylindrical treating chamber 29*a* can be varied by the adjustment of the magnitude of the gap $L_{3a}$, the relationship between the largest diameters $R_{3a}$ and $R_{2a}$, the revolution of the rotor and the suction rate of the suction blower 24.

In prolonging the detention time of the solid particles, it is preferred that the gap $L_3$, is within a range from 1 to 30 mm.

Furthermore, the largest diameter $R_{1a}$ of the rotor 2*a* and the largest diameter $R_{3a}$ of the first powder discharging aperture provided in the first rear wall 8*a* preferably satisfy the following conditions:

$$0.2 \leqq R_{3a}/R_{1a} \leqq 0.9,$$

and more preferably $R_{1a}$, $R_{2a}$ and $R_{3a}$ satisfy the following conditions:

$$0.01 \leqq (R_{3a}-R_{2a})/R_{1a} \leqq 0.35.$$

When the surface treatment is carried out to reduce the shape factor SF-1 of solid particles such as toner particles, the peripheral speed of the outermost periphery of the rotor is preferably within a range from 10 to 200 m/sec, more preferably from 50 to 150 m/sec, for achieving efficient treatment. In such case, the rotor is rotated preferably within a range from 90 to 40,000 rpm, more preferably from 900 to 20,000 rpm.

When treating the surfaces of the solid mother particles by adhering and/or fixing onto the surfaces of the solid mother particles solid daughter particles smaller than the solid mother particles, the peripheral speed of the outermost periphery of the rotor is preferably within a range from 10 to 200 m/sec, more preferably from 50 to 150 m/sec. In such case, the rotor is rotated preferably within a range from 90 to 40,000 rpm, more preferably from 900 to 20,000 rpm.

When adhering and/or fixing onto the surfaces of solid mother particles thermoplastic solid daughter particles smaller than the solid mother particles while thermally softening the solid daughter particles, thereby forming a film derived from the solid daughter particles on the surface of the solid mother particles, the peripheral speed of the outermost periphery of the rotor is preferably within a range from 10 to 200 m/sec, more preferably from 50 to 150 m/sec. In such case, the rotor is rotated preferably within a range from 90 to 40,000 rpm, more preferably from 900 to 20,000 rpm.

In order to efficiently conduct the surface treatment of solid particles, it is preferred that 2 or more cylindrical treating chambers are provided, and, more preferably, such cylindrical treating chambers mutually communicate. The cylindrical treating chambers are provided preferably in a number from 2 to 10, more preferably from 3 to 10. In each cylindrical treating chamber, the solid particles are subjected to the surface treatment in a continuous manner by the blades of the rotor and the sidewall.

It is preferable, for efficiently obtaining the uniformly surface-treated solid particles, that each of the cylindrical treating chambers positioned behind the first one 29*a* satisfies the same conditions as those explained on the first cylindrical treating chamber 29*a*.

For example, the second cylindrical treating chamber 29*b* shown in FIGS. 2 and 3 communicates with the first cylindrical treating chamber 29*a* through the powder discharging aperture 10*a* provided at the center of the first rear wall 8*a*, and the solid particles subjected to the surface treatment in the first cylindrical treating chamber 29*a* are introduced through the powder discharging aperture 10*a* into the central part of the second cylindrical treating chamber 29*b* and are further subjected to surface treatment therein.

In the second cylindrical treating chamber 29*b*, the height H*b* of the blades 9*b* integrated to the second rotor 2*b* to form one structure, the gap $L_{1b}$ between the tips of the blades 9*b* and the guide plate 8*a* constituting the rear wall of the first cylindrical treating chamber 29*a*, which is the front wall of the second cylindrical treating chamber 29*b*, the largest diameter $R_{1b}$ of the second rotor 2*b* and the gap $L_{2b}$ between the blades 9*b* and the lateral wall 7*b* of the second cylindrical treating chamber 2*b* satisfy the following conditions:

$$0.1 \leqq L_{1b}/H_b \leqq 5.0,\ 50\times10^{-3} \leqq H_b/R_{1b} \leqq 400\times10^{-3} \text{ and } 1.0\times10^{-3} \leqq L_{2b}/R_{1b} \leqq 95\times10^{-3}.$$

The ratio $L_{2b}/R_{1b}$ is preferably within a range from $1.5\times10^{-3}$ to $85.0\times10^{-3}$, more preferably from $2.0\times10^{-3}$ to $80.0\times10^{-3}$. Under these conditions, the uniform and efficient surface treatment can be applied to the solid particles, since the solid particles efficiently receive the mechanical impact force by the blades 9*b* and the sidewall 7*b* in the second cylindrical treating chamber 29*b* and have a prolonged detention time by circulating in the second cylindrical treating chamber 29*b*.

For more efficient surface treatment, H*b* is preferably within a range from 10.0 to 500.0 mm, more preferably from 20.0 to 400.0 mm; $L_{1b}$ is preferably within a range from 1 to 300 mm, more preferably from 5 to 200 mm; $R_{1b}$ is preferably within a range from 100 to 2000 mm, more preferably from 150 to 1000 mm; and $L_{2b}$ is preferably within a range from 1.0 to 15.0 mm, more preferably from 1.0 to 10.0 mm.

In order to efficiently carry out the surface treatment of the solid particles, the second rotor 2*b* is preferably provided with 2 to 32 blades, more preferably 4 to 16 blades. For prolonging the detention time of the solid particles and efficiently generating the mechanical impact force to the solid particles by the sidewall, the height H*b* of the blades of the rotor 2*b* is preferably larger than the half-value width $W_b$ of the blades, and more preferably 1.1 to 2.0 times as large as $W_b$.

In order to prolong the detention time of the solid particles, it is preferable that the internal volume $V_b$ of the second cylindrical treating chamber 29*b* is within a range from $1\times10^3$ to $4\times10^6$ $cm^3$, the area $S_b$ of each blade 9*b* is within a range from 10 to 300 $cm^2$ and the half-value width $W_b$ of the blade 9*b* is within a range from 10 to 300 mm.

Furthermore, for achieving efficient surface treatment, it is preferable that in the second cylindrical treating chamber 29*b*, the largest diameter $R_{4b}$ is within a range from 100.5 to 2020 mm, the largest diameter of the powder discharging aperture 10*a* is within a range from 50 to 500 mm, and the largest diameter $R_{3b}$ of the second powder discharging aperture 10*b* is within a range from 50 to 500 mm, and that the largest diameter $R_{2b}$ of the boss portion 2*b*' of the rotor 2*b* is within a range from 30 to 450 mm.

The gap $L_{3b}$ between the rear face of the rotor 2*b* and the second rear wall 8*b* can be adjusted by varying the height of the spacer. For prolonging the stay time of the solid particles, the gap $L_{3b}$ is preferably within a range from 1.0 to 30.0 mm.

In addition, the largest diameter $R_{1b}$ of the rotor 2*b* and the largest diameter $R_{3b}$ of the second powder discharging aperture provided in the second rear wall 8*b* preferably satisfy the following conditions:

$$0.2 \leq R_{3b}/R_{1b} \leq 0.9,$$

and more preferably $R_{1b}$, $R_{2b}$ and $R_{3b}$ satisfy the following conditions:

$$0.01 \leq (R_{3b}-R_{2b})/R_{1b} \leq 0.35.$$

Figure 10:
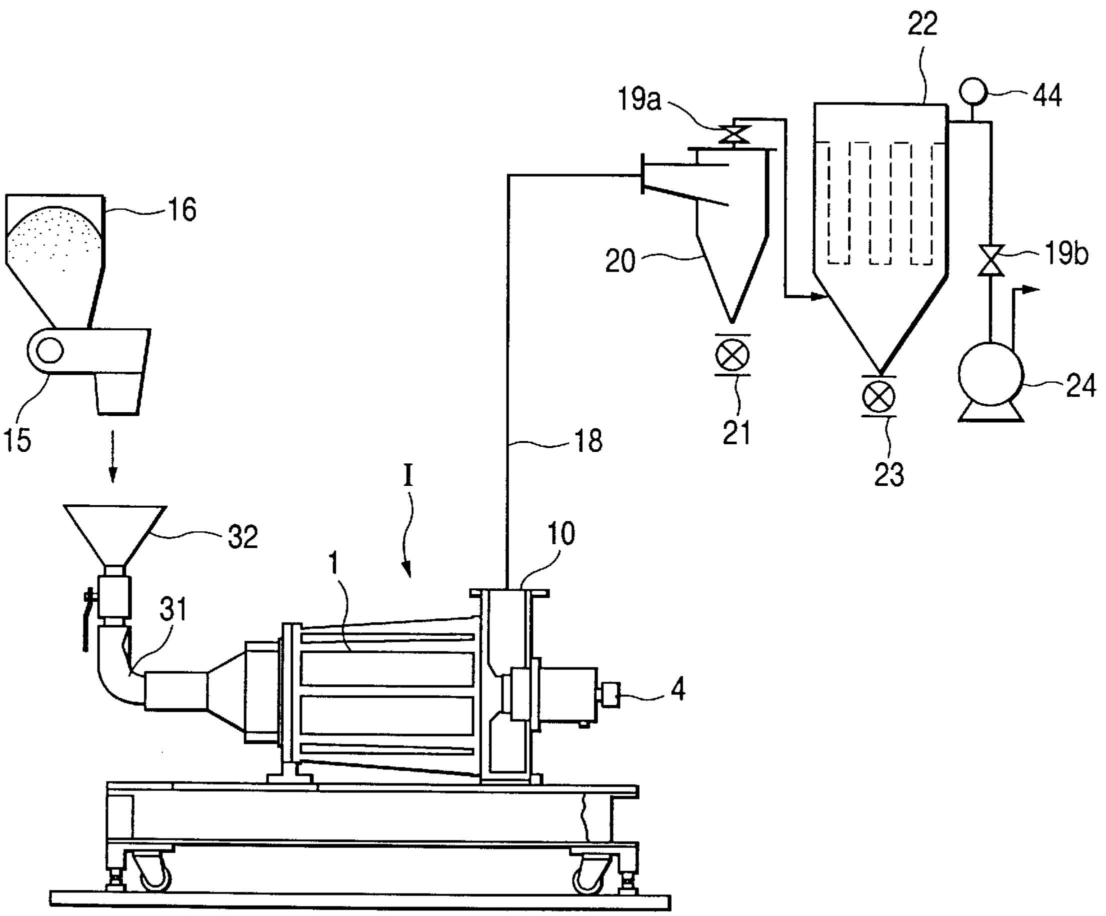
FIG. 10 is a schematic external view of a system having an example of the surface treating apparatus of a horizontal type of the present invention.
Figure 11:
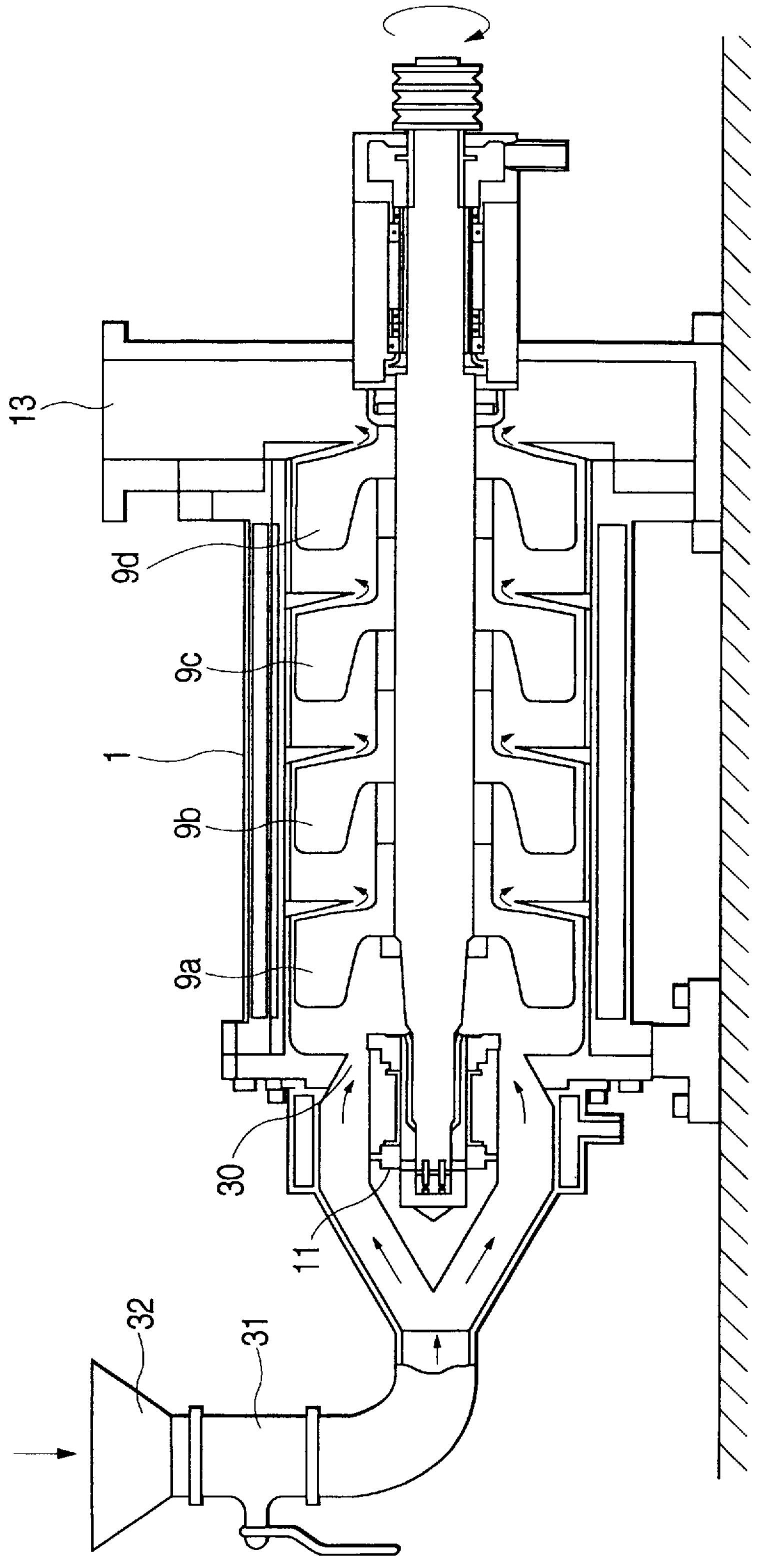
FIG. 11 is a schematic cross-sectional view of the surface treating apparatus of a horizontal type of the present invention.

FIGS. 10 and 11 respectively show a system and a treating apparatus in which the rotary driving shaft is positioned in the horizontal direction.

An example of the surface treating method for the solid particles utilizing the system including the treating apparatus I will be explained below with reference to FIGS. 1 to 3.

The treating apparatus I shown in FIG. 1 is provided with four rotors in the vertical direction. The rotary driving shaft 3 is so rotated by the motor 34 that the outermost peripheral speed of the rotors 2*a*–2*d* is, for example, 100 m/sec, where the revolution of the rotors 2*a*–2*d* is, for example, 7900 rpm. The suction blower 24 is operated to suck an amount of air equal to, or larger than, the amount of air flow generated by the rotation of the blades 9*a*–9*d*. The suction amount of the suction blower can be adjusted by the valves 19*a*, 19*d* under the observation of the flow meter 44. The solid particles are introduced by the suction from the vibration feeder 15 into the hopper together with air, then introduced through the powder supply tube 31 and the powder charging aperture 30 into the center of the first cylindrical treating chamber 29*a* and subjected to surface treatment therein by the blades and the sidewall. The solid particles subjected to surface treatment are introduced, through the first powder discharging aperture 10*a* provided at the center of the guide plate 8*a*, into the center of the second cylindrical treating chamber 29*b* and further subjected to surface treatment therein by the blades and the sidewall.

The solid particles subjected to surface treatment in the second cylindrical treating chamber 29*b* are introduced, through the second powder discharging aperture 10*b* provided at the center of the guide plate 8*b*, into the center of the third cylindrical treating chamber 29*c* and further subjected to surface treatment therein by the blades and the sidewall. The solid particles are further introduced, through the third powder discharging aperture 10*c* provided at the center of the guide plate 8*c*, into the center of the fourth cylindrical treating chamber 29*d* and further subjected to surface treatment by the blades and the sidewall. The air carrying the solid particles is passed, via the first to fourth cylindrical treating chambers 29*a*–29*d*, through the discharge pipe 13, the pipe 17, the cyclone 20, the bag filter 22 and the suction blower 24 and discharged to the exterior of the system.

In each cylindrical treating chamber, the solid particles introduced therein receive instantaneous mechanical impact force by the blades and also receive mechanical impact force upon colliding with the sidewall. The rotation of the blades of a predetermined size provided on the rotor generates a convective air flow circulating in a space above the rotor from the central portion to the peripheral portion and from the peripheral portion to the central portion, whereby the solid particles are detained in the cylindrical treating chamber and are subjected to surface treatment. The detention time of the solid particles can be regulated by the rotation speed and revolution of the rotor, the height and width of the blade and the number of the blade, and also by the suction air amount of the suction blower.

According to passing through the cylindrical treating chambers in succession, the solid particles can be uniformly surface-treated in a continuous and efficient manner.

The surface treatment is concretely described below in the case where the solid particles or the solid matrix particles are toner particles containing at least a binder resin and a coloring material.

As the binder resin for forming the toner particles, know resins may be used. Examples of the binder resin include polystyrene; homopolymers of substituted styrene such as poly-p-chlorostyrene or polyvinyltoluene; styrene-type copolymers such as styrene-p-chlorostyrene copolymer, styrene-vinyltoluene copolymer, styrene-vinylnaphthalene copolymer, styrene-acrylic ester copolymer, styrene-methacrylic ester copolymer, styrene-methyl α-chloromethacrylate copolymer, styrene-acrylonitrile copolymer, styrene-vinyl methyl ether copolymer, styrene-vinyl ethyl ether copolymer, styrene-vinyl methyl ketone copolymer, styrene-butadiene copolymer, styrene-isoprene copolymer or styrene-acrylonitrile-indene copolymer; maleic resin; acrylic resin; methacrylic resin; silicone resin; polyester resin; polyamide resin; furane resin; epoxy resin; and xylene resin. Particularly preferred are styrenic copolymer, polyester resin and epoxy resin.

In the styrene-type copolymers, examples of counter comonomers to a styrene monomer include a double bond-containing monocarboxylic acid or a substitution product thereof such as acrylic acid, methyl acrylate, ethyl acrylate, butyl acrylate, dodecyl acrylate, octyl acrylate, 2-ethylhexyl acrylate, phenyl acrylate, methacrylic acid, methyl methacrylate, ethyl methacrylate, butyl methacrylate, octyl methacrylate, acrylonitrile, methacrylonitrile or acrylamide; a double bond-containing dicarboxylic acid or a substitution product thereof such as maleic acid, butyl maleate, methyl maleate or dimethyl maleate; a vinyl ester such as vinyl chloride, vinyl acetate or vinyl benzoate; an olefin such as ethylene, propylene or butylene; a vinyl ketone such as vinyl methyl ketone or vinyl hexyl ketone; and a vinyl ether such as vinyl methyl ether, vinyl ethyl ether or vinyl isobutyl ether. Such vinylic monomers may be used alone or in combination. As a crosslinking agent, a compound containing two or more polymerizable double bonds may be principally used. Examples of such a compound include an aromatic divinyl compound such as divinylbenzene or divinylnaphthalene; a carboxylic acid ester containing two double bonds such as ethylene glycol diacrylate, ethylene glycol dimethacrylate or 1,3-butanediol dimethacrylate; a divinyl compound such as divinylaniline, divinyl ether, divinyl sulfide or divinyl sulfone; and a compound containing three or more vinyl radicals. These compound may be used alone or in combination.

The coloring material may be an inorganic pigment, an organic pigment or an organic dye.

As a black coloring material, there can be employed carbon black, a magnetic material such as magnetite or ferrite, and a black mixture of yellow/magenta/cyan coloring materials.

The non-magnetic black coloring material, such as carbon black, is used in an amount of 10 to 20 parts by weight per 100 parts by weight of the binder resin.

An example of the magnetic material is a metal oxide which is principally composed of iron and contains elements such as cobalt, nickel, copper, magnesium or manganese as arbitrary components. Particularly preferred are magnetic materials principally composed of iron oxide such as triiron tetroxide or γ-ferric oxide. For controlling the chargeability of a magnetic toner, the magnetic material may contain another metallic element such as silicon or aluminum. Such magnetic material has a BET specific surface area, measured by nitrogen adsorption, preferably within a range of 2 to 30 $m^2/g$, more preferably 3 to 28 $m^2/g$, and preferably has a Mohs hardness of 5 to 7.

It is preferred that the magnetic material has an octahedral, hexahedral or spherical shape and is less in anisotropy, in order to increase the image density. The number-averaged particle size of the magnetic material is preferably within a range of 0.05 to 1.0 μm, more preferably 0.1 to 0.6 μm, and most preferably 0.1 to 0.4 μm.

With respect to 100 parts by weight of the binder resin, the magnetic material is used preferably in an amount of 30 to 200 parts by weight, more preferably 40 to 200 parts by weight and most preferably 50 to 150 parts by weight. An amount less than 30 parts by weight tends to deteriorate a transportability in a developing device utilizing the magnetic force in the toner transportation, thus causing unevenness in the developer layer on a developer carrying member, and is liable to lower an image density due to an increase in the triboelectricity. On the other hand, an amount exceeding 200 parts by weight deteriorates the fixing ability of the magnetic toner.

As a yellow coloring material, there may be employed various compounds represented by condensed azo compounds, isoindolinone compounds, anthraquinone compounds, azo metal complexes, methine compounds and arylamide compounds. Preferred specific examples include C.I. Pigment Yellow 12, 13, 14, 15, 17, 62, 74, 83, 93, 94, 95, 97, 109, 110, 111, 120, 127, 128, 129, 147, 168, 174, 176, 180, 181 and 191.

As a magenta coloring material, the following may be used: condensed azo compounds, diketopyrrolopyrroles, anthraquinones, quinacridones, basic lake dyes, naphthols, benzimidazolones, thioindigo compounds and perylenes. Preferred specific examples include C.I. Pigment Red 2, 3, 5, 6, 7, 23, 48:2, 48:3, 48:4, 57:1, 81:1, 144, 146, 166, 169, 177, 184, 185, 202, 206, 220, 221 and 254.

As a cyan coloring material, copper phthalocyanines and derivatives thereof, anthraquinones and basic lake dyes may be used. Preferred specific examples include C.I. Pigment Blue 1, 7, 15, 15:1, 15:2, 15:3, 15:4, 60, 62 and 66.

These non-magnetic chromatic coloring materials may be used alone, or in a mixture, or in a solid solution. The colored coloring material is selected in view of a hue angle, chroma, brightness, weather resistance, transparency for overhead projection and dispersibility into a toner. The chromatic coloring material is preferably employed in an amount of 1 to 20 parts by weight based on 100 parts by weight of the binder resin.

Wax is preferably contained in toner particles to improve releasability from a fixing means at the time of toner image fixation and fixability. Examples of such wax include paraffin and derivatives thereof, microcrystalline wax and derivatives thereof, Fischer-Tropsch wax and derivatives thereof, polyolefin wax and derivatives thereof and ester wax and derivatives thereof. These derivatives include oxide, block copolymers with vinyl monomers, and graft-modified compounds.

A charge control agent is preferably used in the toner particles either by incorporation therein (internal addition) or by mixing with the toner particles (external addition). The charge control agent allows the charge quantity to be controlled in the optimum manner matching the developing system, particularly, stabilizing the balance between the particle size distribution and the charge amount. A negatively chargeable toner can be obtained using organometallic complexes or chelates, such as monoazo metal complexes, acetylacetone metal complexes, aromatic hydroxycarboxylic acid metal complexes, or aromatic dicarboxylic acid metal complexes. Other examples include aromatic hydroxycarboxylic acids, aromatic mono- and polycarboxylic acids, and metal salts, anhydrides and esters thereof; and phenol derivatives such as bisphenol.

A positively chargeable toner can be obtained using negrosin and modification products thereof modified with metal salts of fatty acids; quaternary ammonium salts such as tributylbenzylammonium-1-hydroxy-4-naphthosulfonate or tetrabutylammonium tetrafluoroborate; onium salts such as phosphonium salts and lake pigments thereof; triphenylmethane dyes and lake pigments thereof (a laking agent such as phosphotungstic acid, phosphomolybdic acid, phosphotomolybdic acid, tannic acid, lauric acid, gallic acid, ferricyanides, ferrocyanides, etc.); metal salts of higher fatty acids; diorgano tin oxides such as dibutyl tin oxide, dioctyl tin oxide or dicyclohexyl tin oxide; and diorgano tin borates such as dibutyl tin borate, dioctyl tin borate or dicyclohexyl tin borate. These compounds can be employed alone or in a combination of two or more kinds.

The charge control agent mentioned above is preferably used in the form of fine particles, where the number-averaged particle size is preferably not larger than 4 μm, more preferably not larger than 3 μm.

In case of internal addition of such charge control agent to the toner particles, it is preferably used in an amount of 0.1 to 20 parts by weight, more preferably 0.2 to 10 parts by weight, based on 100 parts by weight of the binder resin.

The toner particles, which have not been subjected to the surface treatment, can be produced by, for example, a method of producing toner particles by uniformly dispersing a binder resin, coloring material, wax, charge control agent, etc. by the use of a pressure kneader, an extruder or a media disperser, then pulverizing the mixture to a desired toner particle size by mechanical pulverization or by collision against a target under a jet stream, and sharpening the particle size distribution by a classifying step; a method of obtaining toner particles by spraying a fused mixture in the air by the use of a disk or a multi-fluid nozzle as described in the Japanese Patent Publication No. 56-13945; a method of directly forming toner particles by suspension polymerization as disclosed in the Japanese Patent Publication No. 36-10231 and in the Japanese Patent Application Laid-Open Nos. 59-53856 and 59-61842; a method of directly forming toner particles by dispersion polymerization in organic solvent in which the monomer is soluble but the resulting polymer is insoluble; or an emulsion polymerization for directly forming polymer particles by polymerization in the presence of a water-soluble polar polymerization initiator, which is typified by the soap-free polymerizing method.

It is preferred for improving the developability, the resolution and the transferrability of toner particles, that toner particles having large shape factors SF-1, SF-2 obtained by a pulverizing method are treated with the surface treating apparatus of the present invention to make the shape factors SF-1 and SF-2 small.

In the present invention, from the viewpoint of the inhibition of agglomeration and productivity, the thermomechanical impact is preferably applied in the mechanical impact method at a processing temperature close to a glass transition point Tg of toner particles, namely within a range of Tg±10° C. More preferably the process is executed at a temperature of the glass transition point Tg±5° C. of the toner particles, which is particularly effective in reducing the number of 10 nm or larger fine pores on the surface, allowing the inorganic fine powder externally added to the toner particles to effectively function and improving the image transfer efficiency.

The glass transition point of the toner particles or the binder resin is measured with a differential thermal analysis apparatus (DSC measuring apparatus) such as DSC-7 manufactured by Perkin Elmar Inc.

The specimen to be measured is precisely weighed in an amount of 5 to 20 mg, preferably 10 mg.

The weighed specimen is placed in an aluminum pan, and while using an empty aluminum pan for reference, is subjected to measurement at a temperature rising rate of 10° C./min in a temperature range of 30° C. to 200° C. under normal humidity and temperature conditions.

In the course of the temperature rise, a main endothermic peak appears in the temperature range of 40° C. to 100° C.

The glass transition point Tg is defined by the point of intersection at which a line connecting the centers of the base lines before and after the endothermic peak intersects the differential thermal curve.

The surface-treated toner particles are usually mixed with an externally added material to prepare the toner. The obtained toner is used as a one-component developer as it is, or mixed with carrier particles to be used as a two-component developer. As the externally added material, an inorganic fine powder or inorganic fine powder of which surface has been subjected to organic treatment may be used.

The inorganic fine powder is preferably silica, alumina, titania or double oxides thereof, for improving charge stability, developability, flowability and storability. Usable silica includes dry silica, which is called dry-process silica or fumed silica, prepared by vapor phase oxidation of silicon halide or alkoxide, or wet-process silica prepared from alkoxide or water-glass, while the dry-process silica is preferred because it is less in the content of silanol radicals present on the surface, and in the interior, of the silica fine powder, and less in the content of residue such as $Na_aO$ and $SO_3^{2-}$. In the production process of the dry-process silica it is also possible to obtain complex fine powder of silica and other metal oxides by using another metal halide such as aluminum chloride or titanium chloride together with silicon halide, and such complex fine powder is also usable.

Satisfactory results can be obtained with the inorganic fine powder having the BET specific surface area, measured by nitrogen absorption in the BET method, of 30 $m^2/g$ or more, particularly 50 to 400 $m^2/g$. The inorganic fine powder may be used in an amount of 0.1 to 8 parts by weight, preferably 0.5 to 5 parts by weight, more preferably 1.0 to 3.0 parts by weight, based on 100 parts by weight of the toner particles.

The inorganic fine powder preferably has a primary average particle size not larger than 30 nm.

The inorganic fine powder may be treated, if necessary, with a treating agent such as silicone varnish, various modified silicone varnishes, silicone oil, denatured silicone oil, a silane coupling agent, a silane coupling agent with radicals, or other organosilicon or organotitanium compounds, imparting hydrophobicity or regulating chargeability. It is also preferable to treat the inorganic fine powder with two or more kinds of the treating agents.

For maintaining a high charge amount and achieving a high transfer rate, the inorganic fine powder is treated more preferably at least with silicon oil.

For improving transferability and/or cleaning ability, it is also preferable to form the toner by adding, in addition to the above-mentioned inorganic fine powder, inorganic or organic quasi-spherical fine particles having a primary particle size exceeding 30 nm (preferably a specific surface area not exceeding 50 $m^2/g$), more preferably having a primary particle size equal to or larger than 50 nm (preferably with a specific surface area not exceeding 30 $m^2/g$). For example, can be advantageously employed spherical silica particles, spherical polymethylsil sesquioxane particles or spherical resin particles.

Still other externally added materials may be added to the toner particles within an extent in which no detrimental effect is exhibited. Examples of such materials include a lubricant powder such as teflon powder, zinc stearate powder or polyfluorovinylidene powder; abrasive such as cerium powder, silicon carbide powder, calcium titanate powder or strontium titanate powder; an anticaking agent; an electroconductivity imparting agent such as carbon black powder, zinc oxide powder or tin oxide powder; and organic or inorganic fine particles having a polarity opposite to that of the toner particles.

The surface treatment with the treating apparatus of the present invention allows amorphos toner particles to be transformed into spherical particles or particles having at least rounded shapes, and can efficiently produce the toner particles having a specific surface area Sr per unit weight of toner within a range of 0.5 to 1.4 $m^2/g$ and a charge quantity (in a two-component method) per unit weight of toner within a range of 16.0 to 50.0 mC/kg (preferably 18.0 to 30.0 mC/kg).

The toner particles having a spherical shape are hard to crush in a developing device, inhibit its particle size distribution from varying its charge quantity distribution from broadening, and can control background fogging or reversal fogging and improve the flowability of toner. Also, the specific surface area Sr and the charge amount per unit weight of toner maintained in the above-mentioned ranges can improve the transfer efficiency of toner images at the time of transfer from an electrostatic image bearing member to a transfer receiving material, and inhibit faulty transfer (or blank area) from occurring in the middle of a line image.

Figure 24:
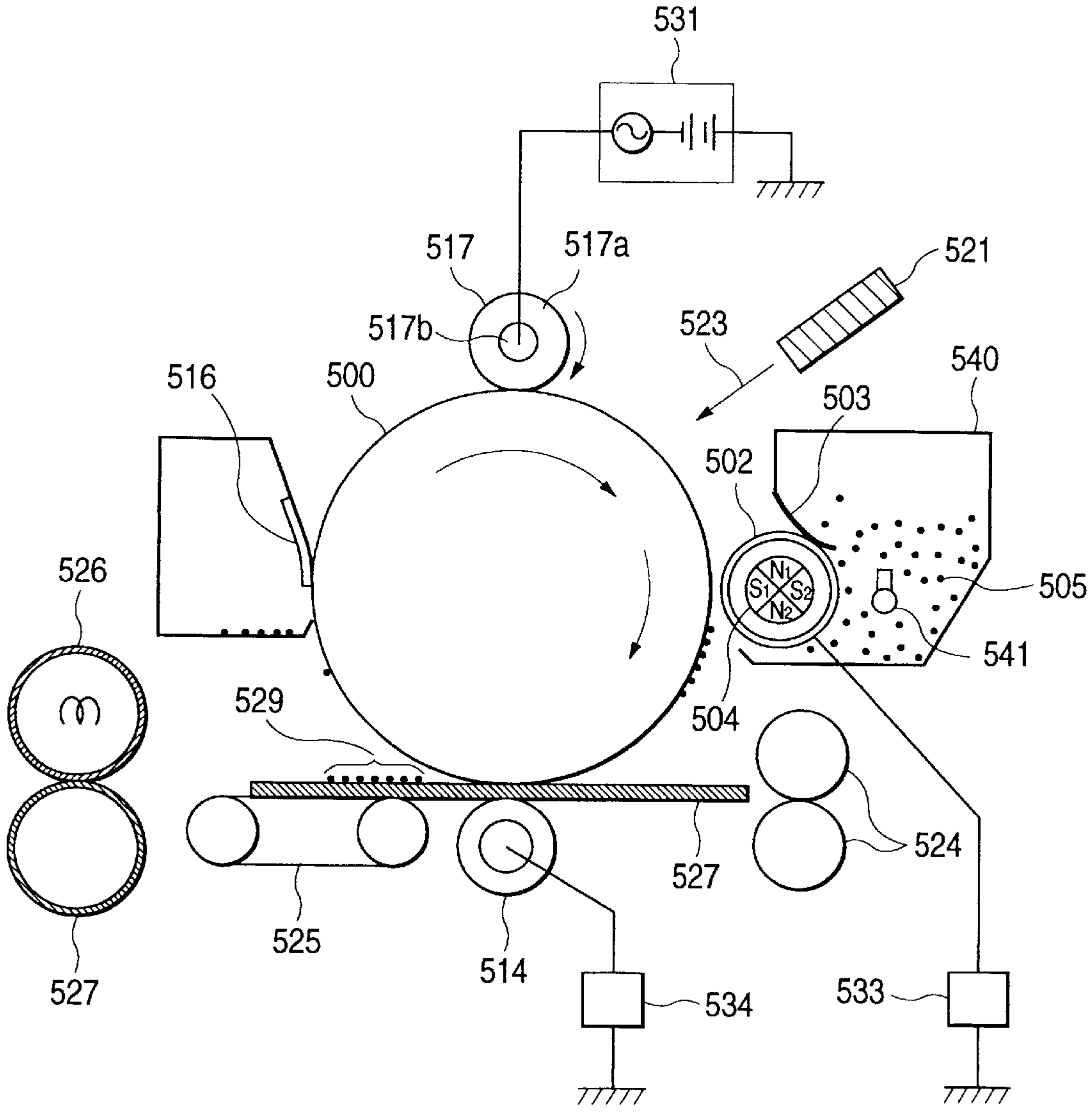
FIG. 24 is a schematic view showing an image forming method which can advantageously employ the toner produced according to the present invention.

With reference to FIG. 24, an example of an image forming method and an image forming apparatus will be described below in which the toner produced by the method of the present invention can be advantageously employed.

Referring to FIG. 24, around a photosensitive member (drum) 500, there are provided a primary charging roller 517 which is a contact charging means, a developing unit 540 which is a developing means, a transfer roller 514 and registration rollers 524. The photosensitive drum 500 is charged by the primary charging roller 517, for example, to −700 V. Bias application means 531 applies, for example, a DC voltage of −1350 V. A digital electrostatic latent image is formed on the photosensitive drum 500 by irradiation with a laser beam 523 from a laser unit 521 and is developed with a magnetic one-component toner in the developing unit 540, and the resulting toner image is transferred onto a transfer receiving material 527 by means of a transfer roller 514 which is in contact with the photosensitive drum 500 via the transfer receiving material 527 and to which a bias voltage is applied by bias application means 534. The transfer receiving material 527 bearing the toner image 529 is transported by a conveyor belt 525 to a heat-pressure fixing device having a heating roller 526 and a pressure roller 527 where the toner image is fixed to the transfer material.

After the transfer step, the toner remaining on the photosensitive drum 500 is removed by cleaning means such as a cleaning blade 516.

The developing unit 540 is provided with a developing sleeve 502 including magnetic field generating means such as a magnet 504, an elastic blade 503, magnetic toner 505 and an stirring rod 505, and a developing bias is applied to the developing sleeve 502 by bias application means 533.

The charging roller 517 is basically composed of a central core metal 517*b* and a conductive elastic layer 517*a* constituting the external periphery. The charging roller 517 is brought into pressure-contact with the surface of the photosensitive drum 500 and rotated in a direction opposite to that of the photosensitive drum 500.

EXAMPLE 1

Following materials:

Styrene-butyl acrylate-divinylbenzene copolymer (monomer ratio: 80.0/19.0/1.0 in polymer; weight-averaged molecular weight Mw: 350,000) as binder resin 100 parts by weight Magnetic iron oxide (average particle size: 0.18 μm) as coloring material 100 parts by weight Monoazo iron complex as charge control agent 2 parts by weight Low molecular weight ethylene-propylene copolymer (wax) 4 parts by weight were well mixed in a Henschel mixer (FM-75 manufactured by Mitsui-Miike Kakoki Co.) and then kneaded in a two-axis kneader (PCM-30 manufactured by Ikegai Tekko Co.) set at 150° C. The kneaded material was granulated with a hammer mill to a size of 1 mm or less to produce a granulated material, which was then pulverized in an air-impact pulverizer and classified in an air classifier to produce magnetic toner particles with a weight-averaged particle size of 6.7 μm (containing particles not larger than 4.00 μm in 15% by number and containing particles equal to, or larger than, 10.01 μm in 2.0% by volume). The untreated magnetic toner particles had shape factors SF-1 of 160 and SF-2 of 155, a glass transition point of 58° C., a BET specific surface area of 1.65 $m^2/g$ and a two-component triboelectric charge quantity of 12.1 mC/kg.

The magnetic toner particles were subjected to surface treatment in the system shown in FIG. 1 having the vertical treating apparatus I shown in FIGS. 2 and 3 and set as indicated in Tables 1 and 2.

The magnetic toner particles introduced into the vibration feeder 15 were introduced through the hopper 32 at a rate of 20 kg/hr. The rotors were rotated at a revolution of 8000 rpm and an outermost peripheral speed of the rotors of 101 m/sec, and the temperature inside the treating apparatus I was 47° C.

When introducing the magnetic toner particles, the blower 24 was operated to suck the air from the cylindrical treating chambers in an amount which is somewhat larger than the amount of air flow generated by the rotation of the blades 9*a*–9*d*, and the magnetic toner particles were collected by the cyclone 20. The introduced magnetic toner particles were surface-treated and collected for a time period of 20 seconds or less. The surface-treated magnetic toner particles had a weight-averaged diameter of 6.5 μm (containing particles not larger than 4.00 μm in 20% by number and containing particles equal to, or larger than, 10.01 μm in 1.5% by volume), SF-1 of 145, SF-2 of 122, a BET specific surface area of 0.89 $m^2/g$ and a two-component triboelectric charge quantity of 23.8 mC/kg.

100 parts by weight of the surface-treated magnetic toner particles and 1.8 parts by weight of hydrophobic dry silica having a primary particle size of 12 nm and subjected to hydrophobic treatment with silicone oil and hexamethyldisilazane to produce a negatively chargeable magnetic toner for developing electrostatic charge image.

The obtained toner was employed in the image forming apparatus shown in FIG. 24, in which a digital latent image (dark potential $V_d$=−700 V, light potential $V_L$=−210 V) was formed by the laser beam on an organic photoconductor (OPC) drum serving as an electrostatic image bearing member. The gap between the photosensitive drum and the developing sleeve was maintained at 300 μm. Used as a toner bearing member was a developing sleeve composed of a resinous layer with a thickness of ca. 7 μm and a JIS center-line average coarseness (Ra) of 1.5 μm, formed on a mirror-finished aluminum cylinder having a diameter of 16 mm. Developing magnetic poles of 95 mT (950 Gauss) and a toner regulating member composed of an urethane rubber blade with a thickness of 1.0 mm and a free length of 10 mm were used and brought into contact with the sleeve at a linear pressure of 14.7N (15 g/cm). The thickness of the toner layer on the developing sleeve was 7 μm.

Phenol resin 100 parts by weight

Graphite (particle size ca. 7 μm) 90 parts by weight

Carbon black 10 parts by weight

The developing bias was composed of a DC bias component $V_{dc}$=−500 V and a superposed AC bias component $V_{P-P}$=1200 V with a frequency f=2000 Hz. The developing sleeve was rotated at a peripheral speed (72 mm/sec) of 150% of the peripheral speed (48 mm/sec) of the photosensitive member in the same direction (i.e., the rotating direction being inverse to that of the photosensitive member).

The digital latent image was developed by a reversal developing method, and the image formation was carried out under the conditions of 23° C. and 65% RH while applying a transfer bias of +2000 V. The transfer sheet was composed of paper of 75 $g/m^2$.

The image transfer from the photosensitive drum to the transfer receiving material was carried out in an efficiency as high as 93%, whereby a satisfactory image was able to be obtained without faulty transfer in the middle of character or line images and without toner scattering around the image.

The toner scattering was evaluated on fine lines relating to the image quality of a graphical image, namely, lines of a width of 100 μm which tend to cause scattering more easily than letter or line images.

The transferability was evaluated by peeling off the toner in a solid black image area on the photosensitive drum with a Mylar adhesive tape, adhering the tape on paper to measure the Macbeth density, and subtracting the Macbeth density of the tape only adhered on the paper.

The specific surface area was calculated according to the BET method, in which nitrogen gas is adsorbed on the surface of a specimen by the use of a specific area measuring instrument Autosorb I (manufactured by Yuasa Ionics Co.) and a calculation is made according to the multi-point BET method.

Figure 23:
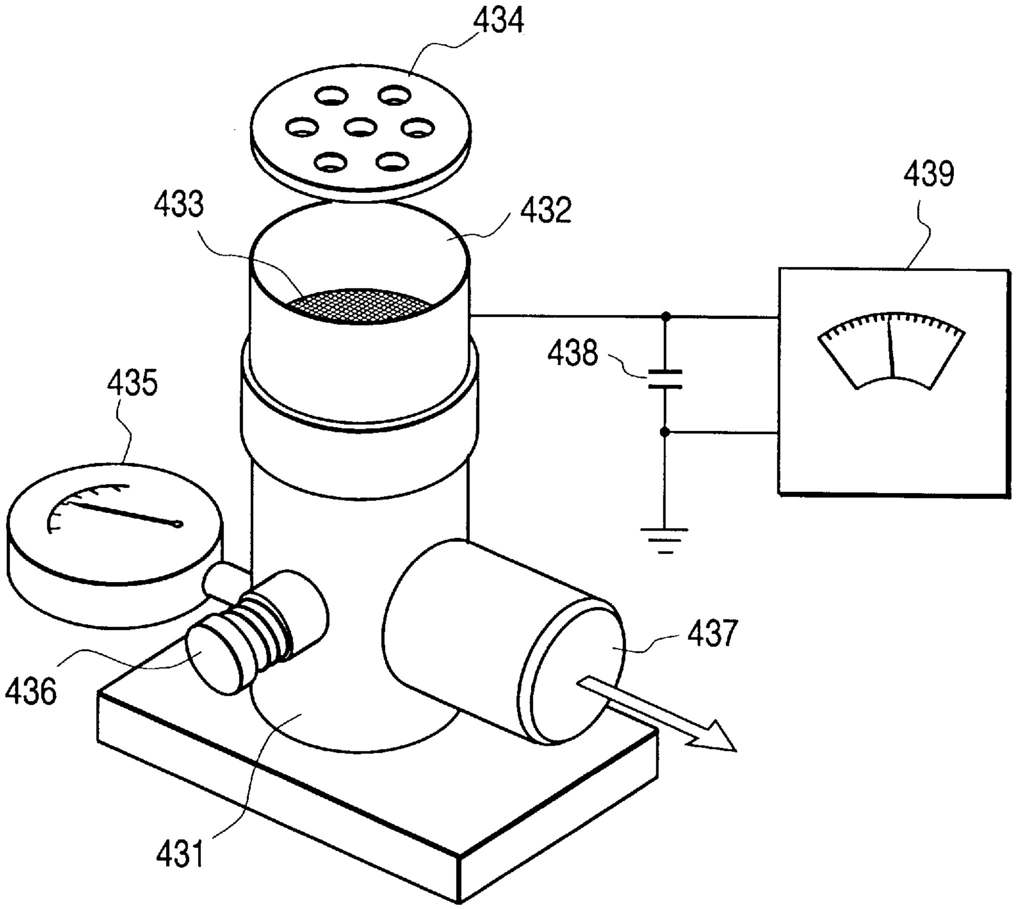
FIG. 23 is a schematic view of a measuring apparatus for measuring the triboelectric charge quantity of toner or powder.

The charge quantity of the toner particles or the toner according to the two-component method (two-component triboelectricity) was measured in the following manner, using a measuring instrument shown in FIG. 23.

Under the conditions of 23° C. and 60% RH, a mixture of 9.5 g of iron powder (EFV200/300 supplied by Powder Tech Co.) as a carrier and 0.5 g of toner particles or toner was placed in a polyethylene bottle of 50 to 100 ml and was manually shaken 50 times. Then 1.0 to 1.2 g of the above-mentioned mixture was placed in a metal measuring container 432 having a screen 433 of 500 mesh at the bottom, and the container was capped with a metal cover 434. In this state, the weight $W_1$ (g) of the entire measuring container 432 was measured. Then air was sucked from a suction aperture 437 of a suction device (composed of an insulating material at least in a part in contact with the measuring container 432), while adjusting a regulating valve 436 so that the pressure was 2450 Pa (250 mm Aq) on a pressure gauge 435. The toner particles or the toner was removed by suction for 1 minute in this state. The potential indicated on a potential meter 439 was measured as V (volt). A capacitor 438 had a capacitance C (μF). The weight $W_2$ (kg) of the entire measuring instrument after the suction was measured. The triboelectricity of the toner particles or the toner was calculated by:

$$\text{Triboelectricity (mC/kg)}=C\times V/(W_1-W_2).$$

EXAMPLE 2

The surface treatment of the toner particles was conducted in the same manner as in Example 1, except that the introduction amount of the untreated magnetic toner particles into the hopper 32 was selected as 15 kg/hr and the revolution of the rotors was selected as 9000 rpm. The surface-treated magnetic toner particles had a weight-averaged particle size of 6.4 μm (containing particles not larger than 4.00 μm in 22% by number and containing particles not smaller than 10.01 μm in 1.5% by volume), SF-1 of 140 and SF-2 of 125, a BET specific surface area of 0.92 $m^2/g$ and a two-component triboelectric charge amount of 22.1 mC/kg.

The magnetic toner was prepared from the surface-treated magnetic toner particles in the same manner as in Example 1 and evaluated as in Example 1. The image transfer from the photosensitive drum to the transfer material was effected in an efficiency as high as 91%, whereby a satisfactory image could be obtained without faulty transfer in the middle of character lines and without toner scattering around the image.

EXAMPLE 3

The magnetic toner particles were subjected to surface treatment in the system shown in FIG. 1 having the treating apparatus shown in FIGS. 2 and 3 and set as indicated in Tables 1 and 2.

The surface treatment of the toner particles was conducted in the same manner as in Example 1, except that the amount of introduction of the untreated magnetic toner particles into the hopper 32 was selected as 80 kg/hr and the revolution of the rotors was selected as 4200 rpm.

The surface-treated magnetic toner particles had a weight-averaged particle size of 6.5 μm (containing particles not larger than 4.00 μm in 19% by number and containing particles not smaller than 10.01 μm in 1.5% by volume), SF-1 of 140 and SF-2 of 125, a BET specific surface area of 0.88 $m^2/g$ and a two-component triboelectricity of 21.0 mC/kg.

The magnetic toner was prepared from the surface-treated magnetic toner particles in the same manner as in Example 1 and evaluated as in Example 1. The image transfer from the photosensitive drum to the transfer material was effected in an efficiency as high as 92%, whereby a satisfactory image could be obtained without faulty transfer in the middle of character lines and without toner scattering around the image.

EXAMPLE 4

Following materials:

Unsaturated polyester resin (binder resin) 100 parts by weight

Magnetic iron oxide (average particle size 0.18 μm, coloring material) 100 parts by weight Monoazo iron complex (charge control agent) 2 parts by weight Low molecular weight ethylene-propylene copolymer (wax) 4 parts by weight were well mixed in a Henschel mixer (FM-75 manufactured by Mitsui-Miike Kakoki Co.) and then were kneaded in a two-axis kneader (PCM-30 manufactured by Ikegai Tekko Co.) set at 150° C. The kneaded material was cooled and granulated with a hammer mill to a size of 1 mm or less, obtaining a granulated material, which was then pulverized by the use of an air-impact pulverizer and classified in an air classifier to produce magnetic toner particles with a weight-averaged particle size of 6.8 μm (containing particles not larger than 4.00 μm in 14% by number and containing particles not smaller than 10.01 μm in 1.4% by volume). The magnetic toner particles had shape factors SF-1 of 170 and SF-2 of 157, a BET specific surface area of 1.75 $m^2/g$ and a two-component triboelectricity of 11.9 mC/kg.

The magnetic toner particles were subjected to surface treatment in the system shown in FIG. 1 having the treating apparatus shown in FIGS. 2 and 3 and set as indicated in Tables 1 and 2.

The surface treatment of the toner particles was conducted in the same manner as in Example 1, except that the introduction amount of the untreated magnetic toner particles into the hopper 32 was selected as 17 kg/hr and the revolution of the rotors was selected as 8300 rpm.

The surface-treated magnetic toner particles had a weight-averaged particle size of 6.6 μm (containing particles not larger than 4.00 μm in 19.5% by number and containing particles not smaller than 10.01 μm in 1.6% by volume), SF-1 of 142 and SF-2 of 130, a BET specific surface area of 0.99 $m^2/g$ and a two-component triboelectricity of 20.0 mC/kg.

The magnetic toner was prepared from the surface-treated magnetic toner particles in the same manner as in Example 1 and evaluated as in Example 1. The image transfer from the photosensitive drum to the transfer material was effected in an efficiency as high as 90%, whereby a satisfactory image could be obtained without failed transfer in the middle of character lines and without toner scattering around the image.

EXAMPLE 5

The surface treatment of the toner particles was conducted in the same manner as in Example 4, except that the introduction amount of the untreated magnetic toner particles into the hopper 32 was selected as 75 kg/hr and the revolution of the rotors was selected as 4400 rpm.

The surface-treated magnetic toner particles had a weight-averaged particle size of 6.3 μm (containing particles not larger than 4.00 μm in 25% by number and containing particles not smaller than 10.01 μm in 0.5% by volume), SF-1 of 144 and SF-2 of 131, a BET specific surface area of 0.83 $m^2/g$ and a two-component triboelectricity of 20.1 mC/kg.

The magnetic toner was prepared from the surface-treated magnetic toner particles in the same manner as in Example 1 and evaluated as in Example 1. The image transfer from the photosensitive drum to the transfer material was effected in an efficiency as high as 90%, whereby a satisfactory image could be obtained without faulty transfer in the middle of character lines and without toner scattering around the image.

EXAMPLE 6

The magnetic toner particles prepared in the same manner as in Example 1 were subjected to surface treatment in a system shown in FIG. 10 having the horizontal treating apparatus shown in FIG. 11 and set as shown in Tables 1 and 2.

The magnetic toner particles were introduced into the vibration feeder 15 through the hopper 32 at a rate of 9.5 kg/hr. The revolution of the rotors was selected as 8000 rpm.

When introducing of the magnetic toner particles, the blower 24 was operated to suck the air from the cylindrical treating chambers in an amount which is somewhat larger than the amount of air flow generated by the rotation of the blades 9*a*–9*d*, and a collection was made by the cyclone 20. The introduced magnetic toner particles were surface-treated and collected for a time period of 20 seconds or less.

The surface-treated magnetic toner particles had a weight-averaged diameter of 6.6 μm (containing particles not larger than 4.00 μm in 18% by number and containing particles not smaller than 10.01 μm in 1.3% by volume), SF-1 of 145, SF-2 of 122, a BET specific surface area of 0.97 $m^2/g$ and a two-component triboelectricity of −21.7 mC/kg.

The magnetic toner was prepared from the surface-treated magnetic toner particles in the same manner as in Example 1 and evaluated as in Example 1. The image transfer from the photosensitive drum to the transfer material was effected in an efficiency as high as 90%, whereby a satisfactory image could be obtained without faulty transfer in the middle of character lines and without toner scattering around the image.

EXAMPLE 7

The surface treatment of the toner particles was conducted in the same manner as in Example 6, except that the introduction amount of the untreated magnetic toner particles into the hopper 32 was selected as 17.5 kg/hr and the revolution of the rotors was selected as 8300 rpm.

The surface-treated magnetic toner particles had a weight-averaged particle size of 6.8 μm (containing particles not larger than 4.00 μm in 17% by number and containing particles not smaller than 10.01 μm in 1.3% by volume), SF-1 of 150 and SF-2 of 130, a BET specific surface area of 1.02 $m^2/g$ and a two-component triboelectricity of 19.8 mC/kg.

The magnetic toner was prepared from the surface-treated magnetic toner particles in the same manner as in Example 1 and evaluated as in Example 1. The image transfer from the photosensitive drum to the transfer material was effected in an efficiency as high as 89%, whereby a satisfactory image could be obtained without faulty transfer in the middle of character lines and without toner scattering around the image.

Comparative Example 1

The magnetic toner particles were subjected to surface treatment in a system shown in FIG. 1 having the vertical treating apparatus shown in FIGS. 2 and 3 and set as shown in Tables 1 and 2. In the treating apparatus used in Comparative Example 1, the ratios $H_{1a}/R_{1a}$ to $H_{1d}/R_{1d}$ were set smaller than the lower limit value in the present invention, and the ratios $L_2a/R_{1a}$ to $L_{2d}/R_{1d}$ were set larger than the upper limit value in the present invention.

The magnetic toner particles prepared in the same manner as in Example 1, were introduced through the hopper 32 at a rate of 20 kg/hr. The revolution of the rotors was selected as 8000 rpm. The blower 24 was operated to suck the air from the cylindrical treating chambers in an amount which was somewhat larger than the amount of air flow generated by the rotation of the blades 9*a*–9*d*, and the treated magnetic toner particles were collected by the cyclone 20. The introduced magnetic toner particles were surface-treated and collected for a time period of 20 seconds or less.

The surface-treated magnetic toner particles had a weight-averaged diameter of 6.7 μm (containing particles not larger than 4.00 μm in 16% by number and containing particles not smaller than 10.01 μm in 1.6% by volume), SF-1 of 158, SF-2 of 151, a BET specific surface area of 1.57 $m^2/g$ and a two-component triboelectricity of −14.2 mC/kg.

The magnetic toner was prepared from the surface-treated magnetic toner particles in the same manner as in Example 1 and evaluated as in Example 1. The image transfer from the photosensitive drum to the transfer material was effected in an efficiency of 83%, and faulty transfer in the middle of the character lines and toner scattering around the image occurred.

Comparative Example 2

The magnetic toner particles were subjected to surface treatment in a system shown in FIG. 1, having the vertical treating apparatus shown in FIGS. 2 and 3 and set as shown in Tables 1 and 2. In the treating apparatus used in Comparative Example 2, the ratios $L_{1a}/H_a$ to $L_{1d}/H_d$ were set smaller than the lower limit value in the present invention, and the ratios $H_a/R_{1a}$ to $H_d/R_{1d}$ were set larger than the upper limit value in the present invention.

The untreated magnetic toner particles prepared in the same manner as in Example 1 were introduced through the hopper 32 at a rate of 20 kg/hr. The revolution of the rotors was selected as 8000 rpm. The blower 24 was operated to suck the air from the cylindrical treating chambers in an amount which was somewhat larger than the amount of air flow generated by the rotation of the blades 9*a*–9*d*, and the treated magnetic toner particles were collected by the cyclone 20. The introduced magnetic toner particles were surface treated and collected for a time period of 20 seconds or less.

The surface-treated magnetic toner particles had a weight-averaged diameter of 6.9 μm (containing particles not larger than 4.00 μm in 15.5% by number and containing particles not smaller than 10.01 μm in 2.5% by volume), SF-1 of 155, SF-2 of 150, a BET specific surface area of 1.52 $m^2/g$ and a two-component triboelectricity of −14.8 mC/kg.

The magnetic toner was prepared from the surface-treated magnetic toner particles in the same manner as in Example 1 and evaluated as in Example 1. The image transfer from the photosensitive drum to the transfer material was effected in efficiency of 85%, and faulty transfer in the middle of the character lines and toner scattering on the image occurred.

Comparative Example 3

The magnetic toner particles were subjected to surface treatment in a system shown in FIG. 1 having the vertical treating apparatus shown in FIGS. 2 and 3 and set as shown in Tables 1 and 2. In the treating apparatus used in Comparative Example 3, the ratios $L_{1a}/H_a$ to $L_{1d}/H_d$ were set larger than the upper limit value of the present invention.

The untreated magnetic toner particles prepared in the same manner as in Example 1 were introduced through the hopper 32 at a rate of 20 kg/hr. The revolution of the rotors was selected as 8000 rpm. The blower 24 was operated to suck the air from the cylindrical treating chambers in an amount which was somewhat larger than the amount of air flow generated by the rotation of the blades 9*a*–9*d*, and the treated magnetic toner particles were collected by the cyclone 20. The introduced magnetic toner particles were surface-treated and collected for a time period of 20 seconds or less.

The surface-treated magnetic toner particles had a weight-averaged diameter of 6.7 μm (containing particles not larger than 4.00 μm in 14.9% by number and containing particles not smaller than 10.01 μm in 2.0% by volume), SF-1 of 158, SF-2 of 152, a BET specific surface area of 1.53 $m^2/g$ and a two-component triboelectricity of −12.8 mC/kg.

The magnetic toner was prepared from the surface-treated magnetic toner particles in the same manner as in Example 1 and evaluated as in Example 1. The image transfer from the photosensitive drum to the transfer material was effected in efficiency of 82%, and faulty transfer in the middle of the character lines and toner scattering around on the image occurred.

Comparative Example 4

The magnetic toner particles were subjected to surface treatment in a system shown in FIG. 1 having the vertical treating apparatus shown in FIGS. 2 and 3 and set as shown in Tables 1 and 2. In the treating apparatus used in Comparative Example 4, the ratios $L_{2a}/R_{1a}$ to $L_{2d}/R_{1d}$ were set smaller than the lower limit value of the present invention.

The untreated magnetic toner particles prepared in the same manner as in Example 1 were introduced through the hopper 32 at a rate of 20 kg/hr. The revolution of the rotors was selected as 8000 rpm. The blower 24 was operated to suck the air from the cylindrical treating chambers in an amount which was somewhat larger than the amount of air flow generated by the rotation of the blades 9*a*–9*d*, and the treated magnetic toner particles were collected by the cyclone 20. The introduced magnetic toner particles were surface treated and collected for a time period of 20 seconds or less.

The surface-treated magnetic toner particles had a weight-averaged diameter of 6.7 μm (containing particles not larger than 4.00 μm in 15% by number and containing particles not smaller than 10.01 μm in 2.0% by volume), SF-1 of 160, SF-2 of 155, a BET specific surface area of 1.65 $m^2/g$ and a two-component triboelectricity of −12.1 mC/kg.

The magnetic toner was prepared from the surface-treated magnetic toner particles in the same manner as in Example 1 and evaluated as in Example 1. In the image formation under the same conditions same as in Example 3, the image transfer from the photosensitive drum to the transfer material was effected in efficiency of 80%, and failed transfer in the middle of the character lines and toner scattering around the image occurred.

Comparative Example 5

The magnetic toner particles were subjected to surface treatment in a system shown in FIG. 1 having the vertical treating apparatus shown in FIGS. 2 and 3 and set as shown in Tables 1 and 2. In the treating apparatus used in Comparative Example 5, the ratios $L_{1a}/H_a$ to $L_{1d}/H_d$ were set smaller than the lower limit value of the present invention, and the ratios $H_a/R_{1a}$ to $H_d/R_{1d}$ and the ratios $L_{2a}/R_{1a}$ to $L_{2d}/R_{1d}$ were set larger than the upper limit values of the present invention.

The untreated magnetic toner particles prepared in the same manner as in Example 1 were introduced through the hopper 32 at a rate of 20 kg/hr. The revolution of the rotors was selected as 8000 rpm. The blower 24 was operated to suck the air from the cylindrical treating chambers in an amount which was somewhat larger than the amount of air flow generated by the rotation of the blades 9*a*–9*d*, and the treated magnetic toner particles were collected by the cyclone 20. The introduced magnetic toner particles were surface-treated and collected for a time period of 20 seconds or less.

The surface-treated magnetic toner particles had a weight-averaged diameter of 6.7 μm (containing particles not larger than 4.00 μm in 15% by number and containing particles not smaller than 10.01 μm in 2.0% by volume), SF-1 of 160, SF-2 of 155, a BET specific surface area of 1.65 $m^2/g$ and a two-component triboelectricity of −12.1 mC/kg.

The magnetic toner was prepared from the surface-treated magnetic toner particles in the same manner as in Example 1 and evaluated as in Example 1. The image transfer from the photosensitive drum to the transfer material was effected in efficiency of 80%, and faulty transfer in the middle of the character lines and toner scattering on the image occurred.

TABLE 1

| | $\frac{L_{1a}}{H_a}-\frac{L_{1d}}{H_d}$ | $\frac{H_a}{R_{1a}}-\frac{H_d}{R_{1d}}$ | $\frac{L_{2a}}{R_{1a}}-\frac{L_{2d}}{R_{1d}}$ | $\frac{L_{1a}}{R_{4a}}-\frac{L_{1d}}{R_{4d}}$ | $\frac{L_{3a}}{R_{4a}}-\frac{L_{3d}}{R_{4d}}$ | $\frac{R_{3a}-R_{2a}}{R_{4a}}-\frac{R_{3d}-R_{2d}}{R_{4d}}$ | $\frac{L_{3a}}{R_{1a}}-\frac{L_{3d}}{R_{1d}}$ |
|---|---|---|---|---|---|---|---|
| Example 1 | 0.6 | $256 \times 10^{-3}$ | $17 \times 10^{-3}$ | 0.968 | 0.460 | 0.06 | 0.5 |
| Example 3 | 0.6 | $255 \times 10^{-3}$ | $8 \times 10^{-3}$ | 0.968 | 0.467 | 0.06 | 0.5 |
| Example 6 | 0.6 | $256 \times 10^{-3}$ | $17 \times 10^{-3}$ | 0.968 | 0.460 | 0.06 | 0.5 |
| Reference Example 1 | 1.9 | $30 \times 10^{-3}$ | $100 \times 10^{-3}$ | 0.833 | 0.417 | 0.25 | 0.5 |
| Reference Example 2 | 0.04 | $405 \times 10^{-3}$ | $17 \times 10^{-3}$ | 0.968 | 0.460 | 0.06 | 0.5 |
| Reference Example 3 | 5.9 | $170 \times 10^{-3}$ | $17 \times 10^{-3}$ | 0.968 | 0.460 | 0.06 | 0.5 |
| Reference Example 4 | 0.6 | $292 \times 10^{-3}$ | $0.9 \times 10^{-3}$ | 0.848 | 0.460 | 0.06 | 0.5 |
| Reference Example 5 | 0.02 | $450 \times 10^{-3}$ | $505 \times 10^{-3}$ | 1.126 | 0.460 | 0.06 | 0.5 |

TABLE 1-continued

| | $\frac{R_{3a}-R_{2a}}{R_{1a}} - \frac{R_{3d}-R_{2d}}{R_{1d}}$ | $\frac{L_{3a}}{R_{1a}} - \frac{L_{3d}}{R_{1d}}$ | $\frac{R_5}{R_{1a}}$ | $\frac{W_a}{H_a} - \frac{W_d}{H_d}$ | $\frac{W_a}{R_{1a}} - \frac{W_d}{R_{1d}}$ | $\frac{S_a}{V_a} - \frac{S_d}{V_d}$ |
|---|---|---|---|---|---|---|
| Example 1 | 0.0620 | 0.0207 | 0.591 | 0.806 | 0.207 | 0.00504 |
| Example 3 | 0.0583 | 0.0108 | 0.592 | 0.806 | 0.207 | 0.00200 |
| Example 6 | 0.0620 | 0.0207 | 0.591 | 0.806 | 0.207 | 0.00504 |
| Reference Example 1 | 0.3000 | 0.0567 | 0.633 | 8.890 | 0.267 | 0.00212 |
| Reference Example 2 | 0.0620 | 0.0207 | 0.591 | 0.469 | 0.190 | 0.00680 |
| Reference Example 3 | 0.0620 | 0.0207 | 0.591 | 1.268 | 0.215 | 0.00119 |
| Reference Example 4 | 0.0708 | 0.0236 | 0.591 | 0.548 | 0.160 | 0.00328 |
| Reference Example 5 | 0.0675 | 0.0225 | 0.644 | 0.340 | 0.153 | 0.00547 |

TABLE 2

| | $R_{1a}$–$R_{1d}$ (mm) | $R_{2a}$–$R_{2d}$ (mm) | $R_{3a}$–$R_{3d}$ (mm) | $R_{4a}$–$R_{4d}$ (mm) | $R_5$ (mm) | $H_a$–$H_d$ (mm) | $S_a$–$S_d$ ($cm^2$) |
|---|---|---|---|---|---|---|---|
| Example 1 | 242.0 | 100.0 | 115.0 | 250.0 | 143.0 | 62.0 | 32.0 |
| Example 3 | 600.0 | 250.0 | 285.0 | 610.0 | 355.0 | 153.0 | 195.0 |
| Example 6 | 242.0 | 100.0 | 115.0 | 250.0 | 143.0 | 62.0 | 32.0 |
| Reference Example 1 | 300.0 | 60.0 | 150.0 | 360.0 | 190.0 | 9.0 | 7.0 |
| Reference Example 2 | 242.0 | 100.0 | 115.0 | 250.0 | 143.0 | 98.0 | 43.5 |
| Reference Example 3 | 242.0 | 100.0 | 115.0 | 250.0 | 143.0 | 41.0 | 16.5 |
| Reference Example 4 | 212.0 | 100.0 | 115.0 | 250.0 | 143.0 | 62.0 | 21.0 |
| Reference Example 5 | 222.0 | 100.0 | 115.0 | 250.0 | 143.0 | 100.0 | 35.0 |

| | $W_a$–$W_d$ (mm) | $L_{1a}$–$L_{1d}$ (mm) | $L_{2a}$–$L_{2d}$ (mm) | $L_{3a}$–$L_{3d}$ (mm) | Number of blades $9_a$–$9_d$ | Internal volume V ($cm^3$) of cylindrical treating chambers $29_a$–$29_d$ |
|---|---|---|---|---|---|---|
| Example 1 | 50.0 | 40.0 | 4.0 | 5.0 | 8 | $6.4 \times 10^3$ |
| Example 3 | 124.0 | 99.0 | 5.0 | 6.5 | 16 | $97.6 \times 10^3$ |
| Example 6 | 50.0 | 40.0 | 4.0 | 5.0 | 8 | $6.4 \times 10^3$ |
| Reference Example 1 | 80.0 | 17.0 | 30.0 | 17.0 | 8 | $3.3 \times 10^3$ |
| Reference Example 2 | 46.0 | 4.0 | 4.0 | 5.0 | 8 | $6.4 \times 10^3$ |
| Reference Example 3 | 52.0 | 241.0 | 4.0 | 5.0 | 8 | $13.9 \times 10^3$ |
| Reference Example 4 | 34.0 | 40.0 | 19.0 | 5.0 | 8 | $6.4 \times 10^3$ |
| Reference Example 5 | 34.0 | 2.0 | 12.0 | 5.0 | 8 | $6.4 \times 10^3$ |

Comparative Example 6

Figure 12:
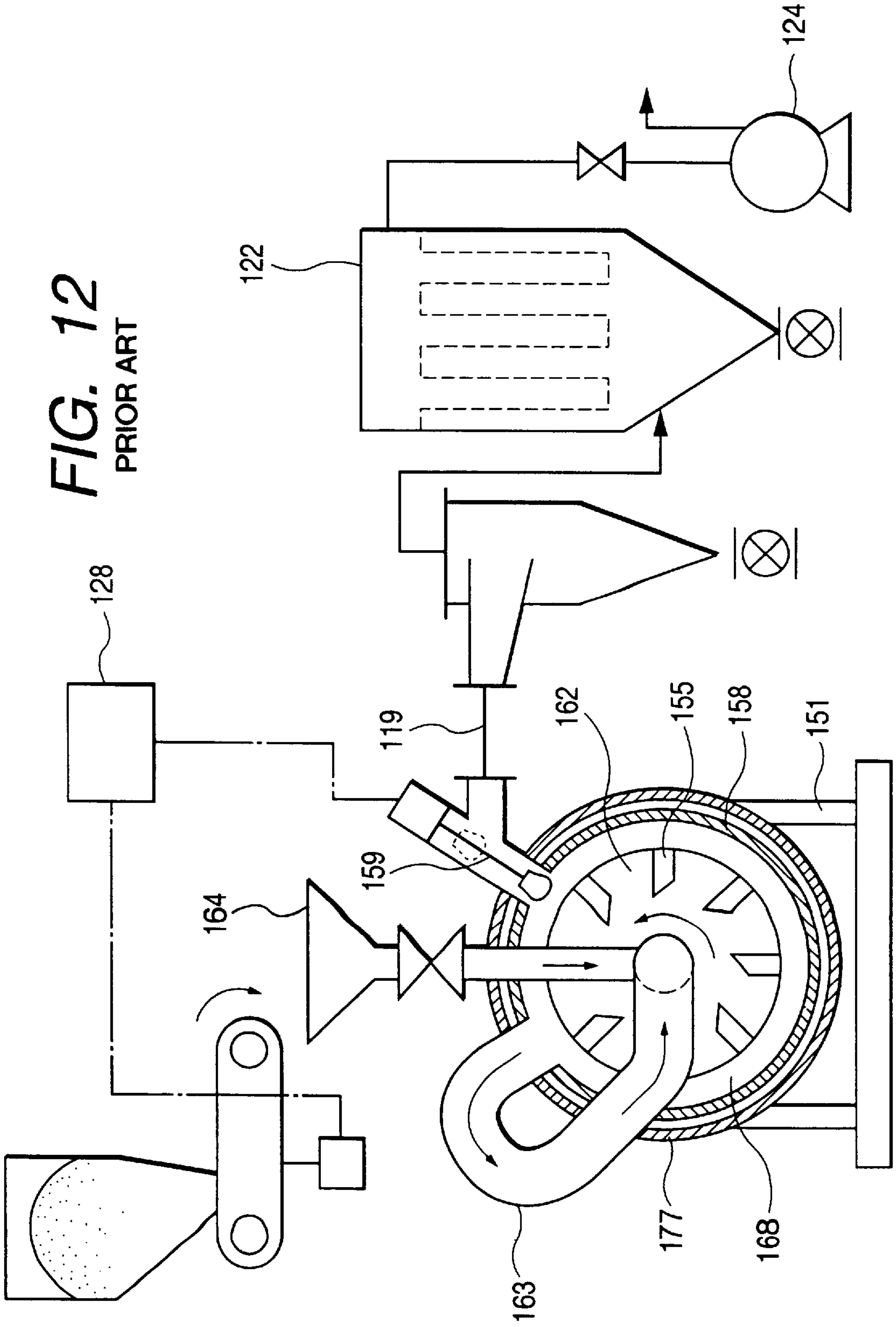
FIG. 12 is a schematic view of a conventional surface treating system.
Figure 14:
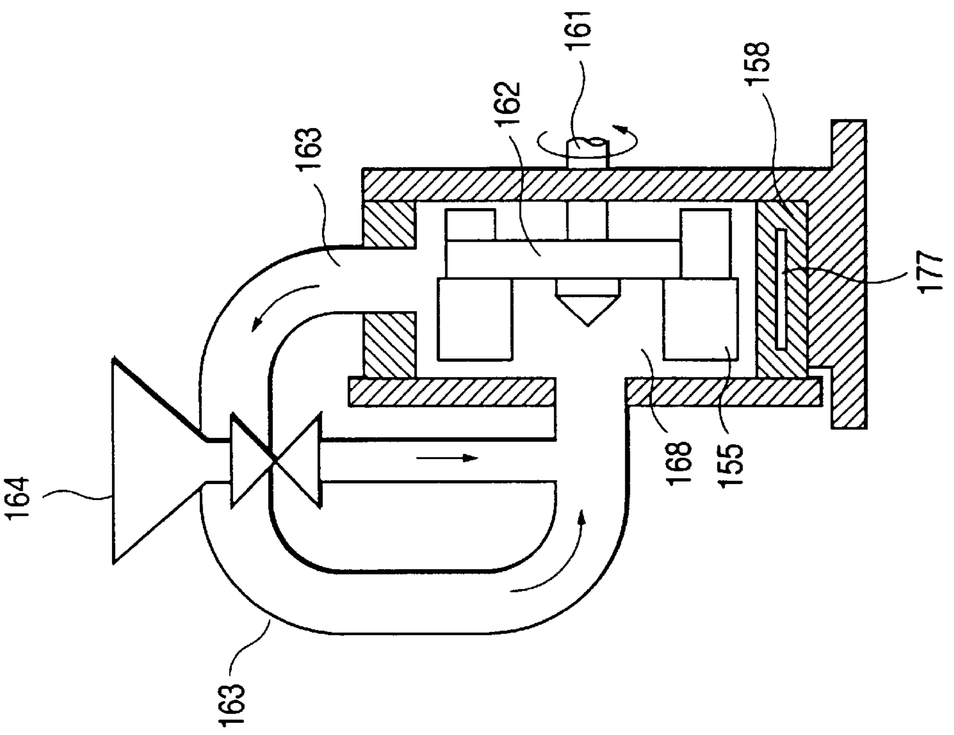
FIG. 14 is a schematic cross-sectional view of a conventional surface treating apparatus taken along the line 14—14 shown in FIG. 13.
Figure 13:
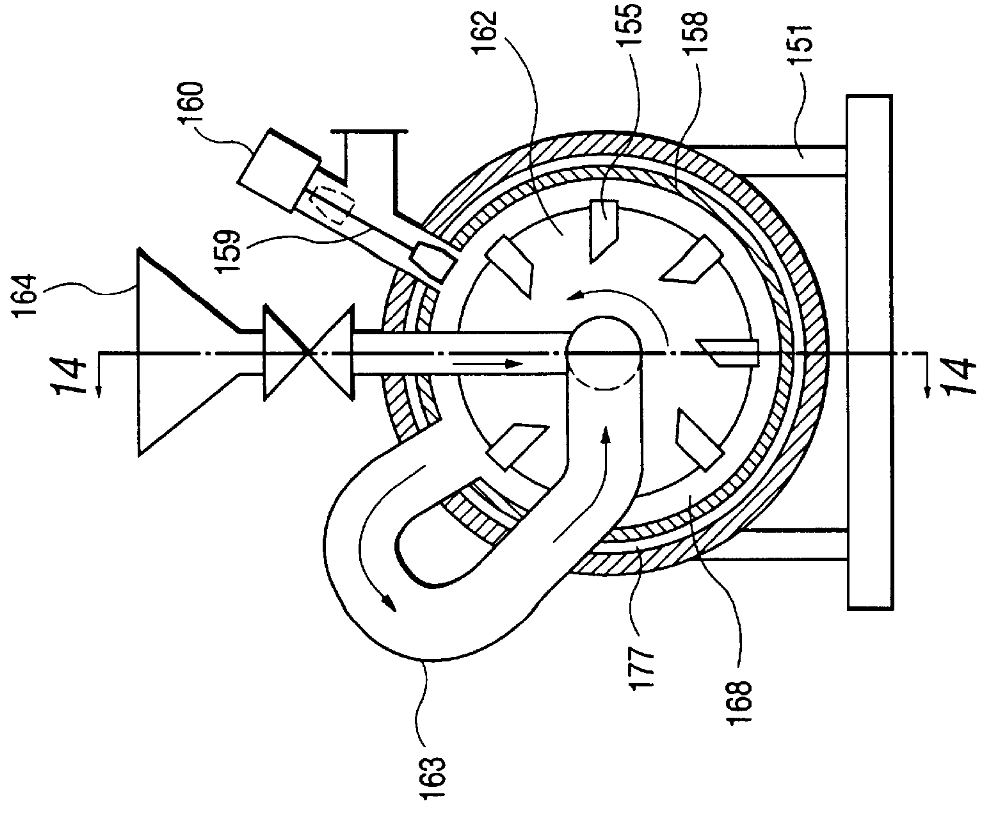
FIG. 13 is a schematic cross-sectional view of a conventional surface treating apparatus.

The magnetic toner particles prepared in the same manner as in Example 1 were subjected to surface treatment in a batch-type treating apparatus having the recycle valve 163 as shown in FIGS. 12 to 14. The rotor 162 having the blades 155 had a largest diameter of 242 mm, and was rotated at a revolution of 8200 rpm. The batch-type treating apparatus employed in Comparative Example 6 had no powder discharging aperture in the wall opposed to the rear face of the rotor 162, but the magnetic toner particles were recycled through a recycle valve 163 provided on the side wall, so that the uniform surface treatment of the magnetic toner particles was harder to achieve than in the treating apparatus of the present invention. Because of the batch operation, each cycle of "weighing, charging, surface treatment and discharging" took 3 minutes, and since the amount charged at a time was 300 g, the processing rate was 3.6 kg/hr, which was less than ⅕ the capacity of the treating apparatus of the present invention. If the magnetic toner particles of a larger amount was supplied, the fusing of the magnetic toner particles occurred in the impact chamber 168 or a longer processing time was required for reaching the desired level of treatment.

The surface-treated magnetic toner particles had a weight-averaged diameter of 6.5 μm (containing particles not larger than 4.00 μm in 23% by number and containing particles not smaller than 10.01 μm in 1.5% by volume), SF-1 of 145, SF-2 of 122, a BET specific surface area of 0.81 $m^2$/g and a two-component triboelectricity of −25 mC/kg.

The magnetic toner was prepared from the surface-treated magnetic toner particles in the same manner as in Example 1 and evaluated as in Example 1. The image transfer efficiency was 88% and inferior to that of the magnetic toner in Example 1.

Comparative Example 7

The magnetic toner particles prepared in the same manner as in Example 4 were subjected to surface treatment in the batch-type treating apparatus employed in Comparative Example 6. The rotor 162 was rotated at a revolution of 8600 rpm.

Because of the batch operation, each cycle of weighing, charging, surface treatment and discharging took 5 minutes, and the amount charged at a time was 300 g. Consequently the amount of processing, being 3.6 kg/hr, was less than ⅕ as compared with the capacity of the treating apparatus of the present invention. With the supply of the magnetic toner particles of a larger amount, the fusing of the magnetic toner particles occurred in the impact chamber 168.

Comparative Example 8

Figure 15:
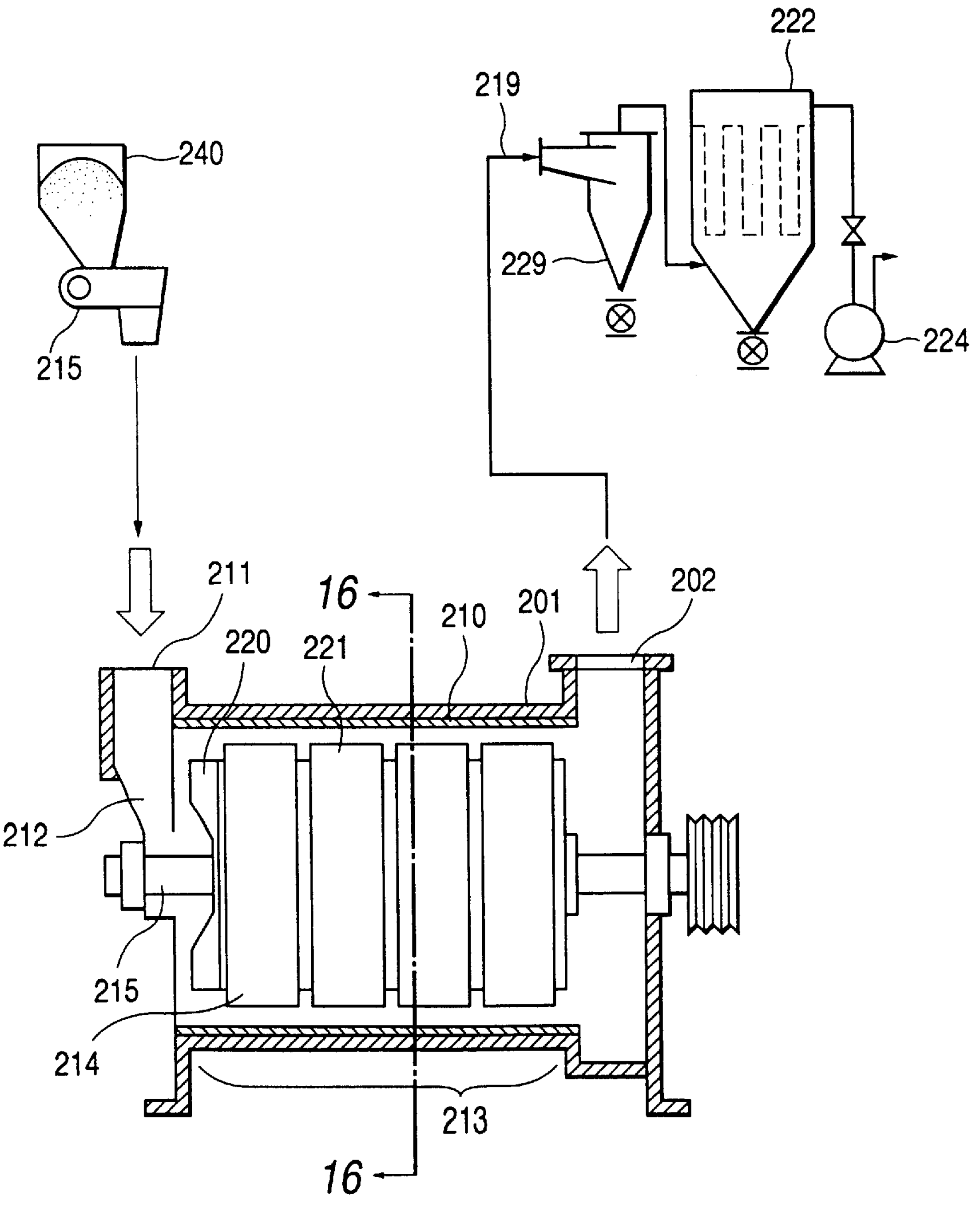
FIG. 15 is a schematic view showing another conventional surface treating system.
Figure 16:
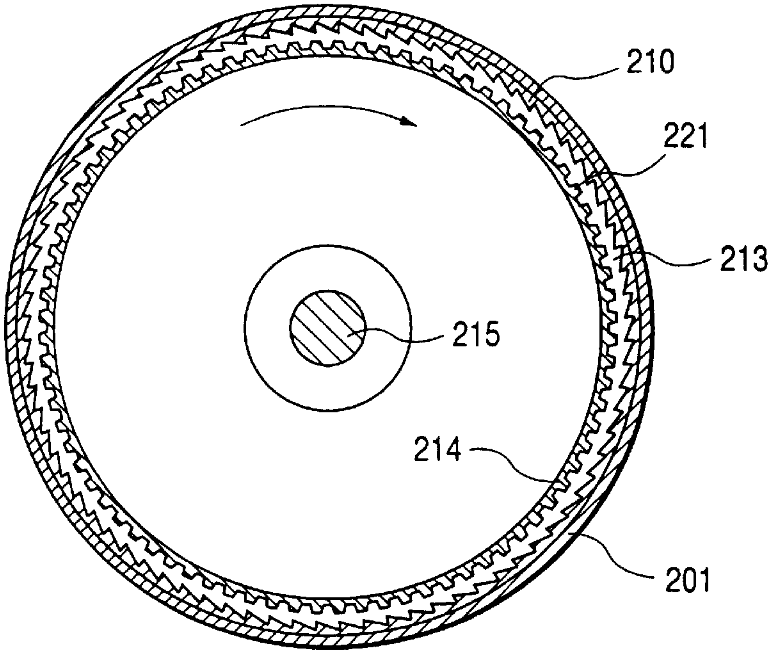
FIG. 16 is a schematic cross-sectional view taken along the line 16—16 shown in FIG. 15.
Figure 17:
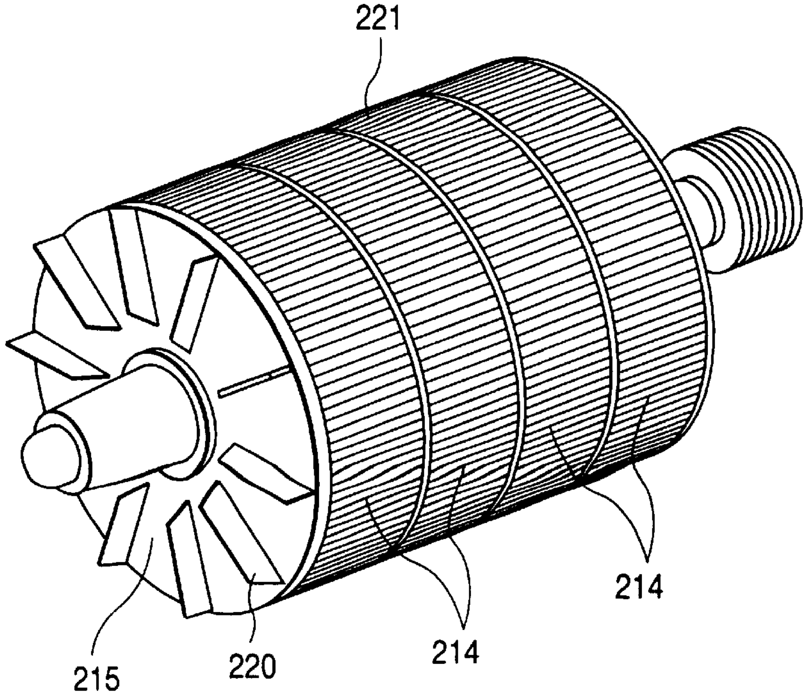
FIG. 17 is a perspective view of the rotor shown in FIG. 15.
Figure 18:
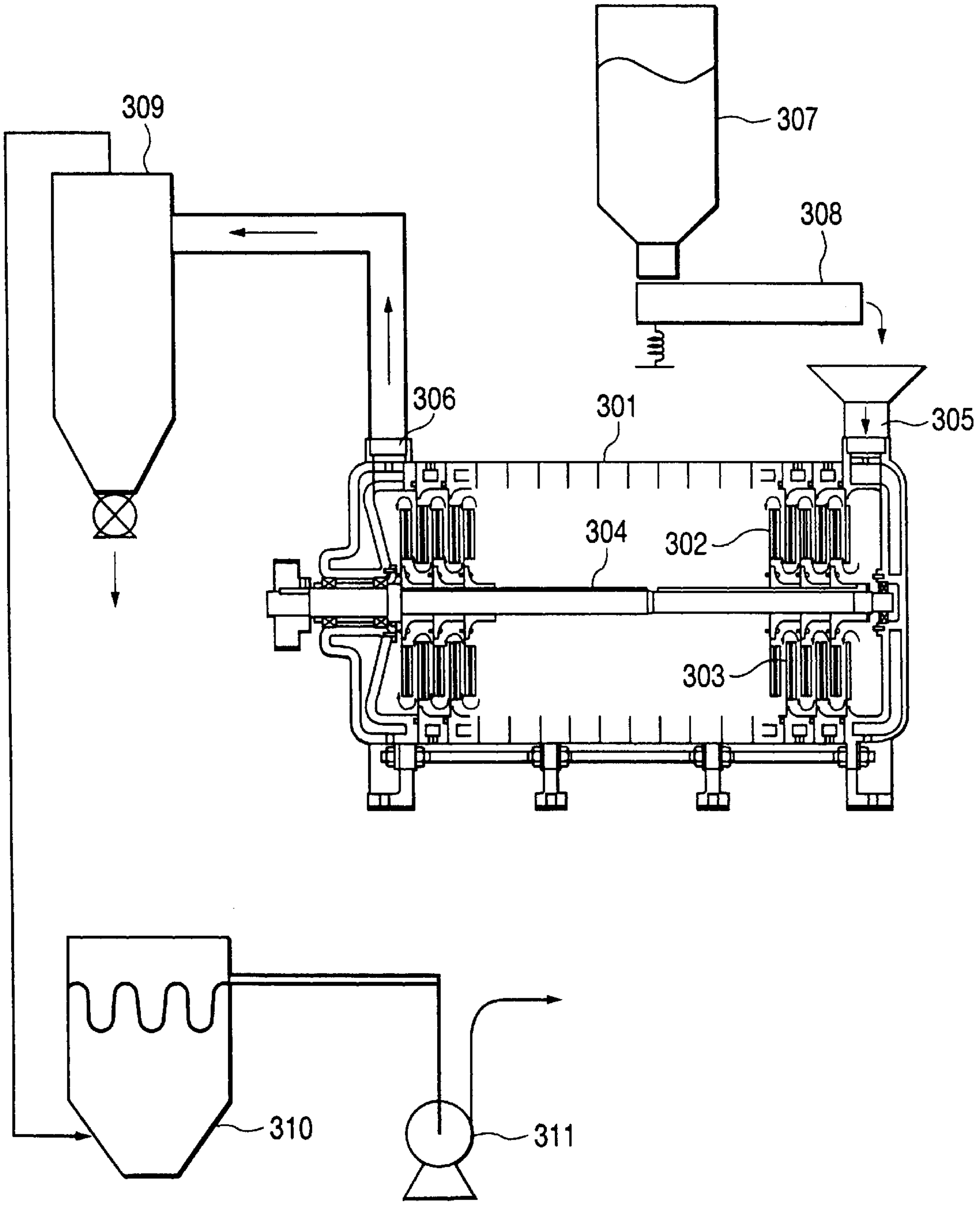
FIG. 18 is a schematic view of another conventional surface treating system.
Figure 19:
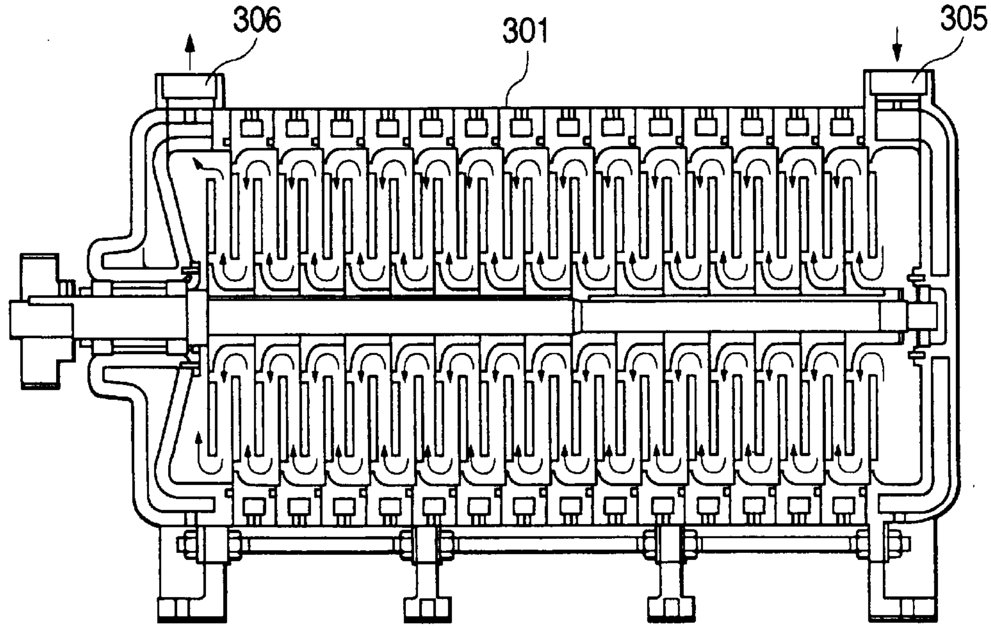
FIGS. 19 and 20 are schematic cross-sectional views of the surface treating apparatus shown in FIG. 18.
Figure 20:
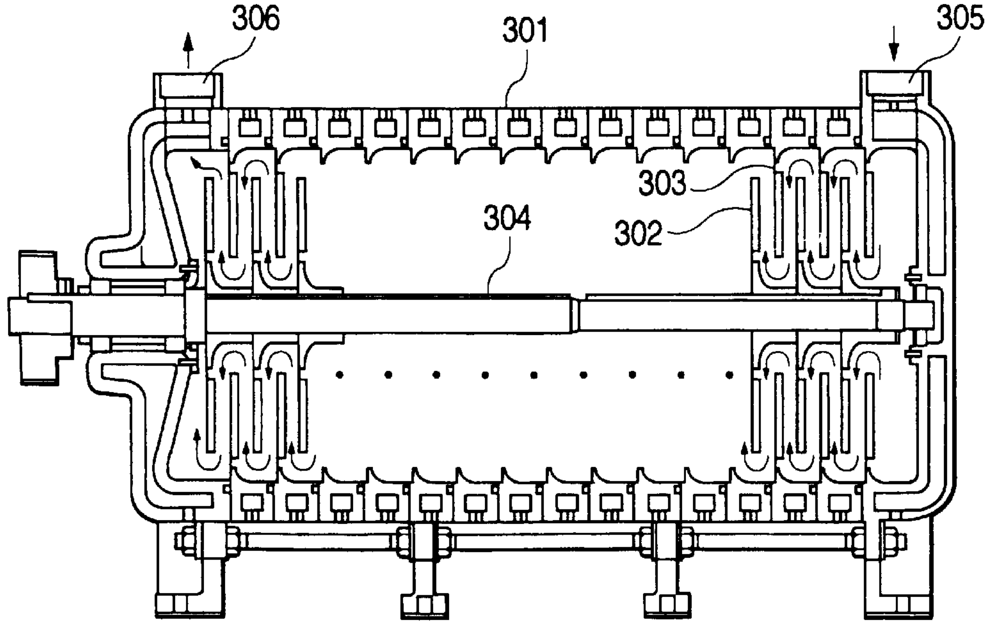
Figure 21:
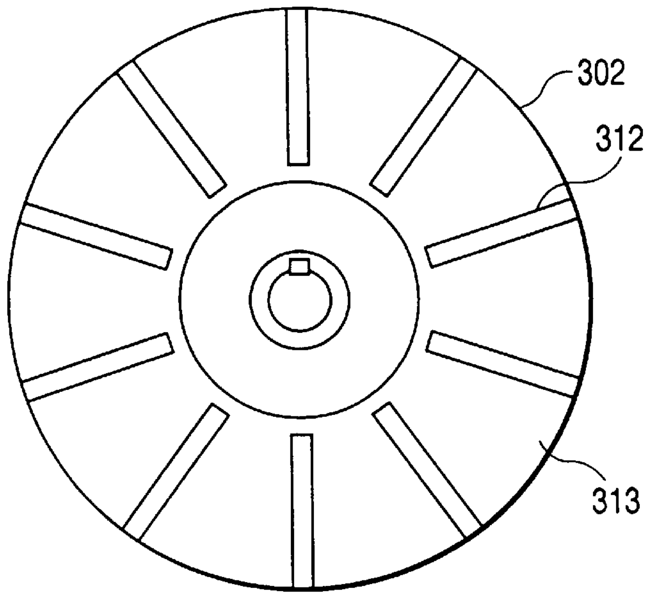
FIG. 21 is a schematic view of a rotary blade.
Figure 22:
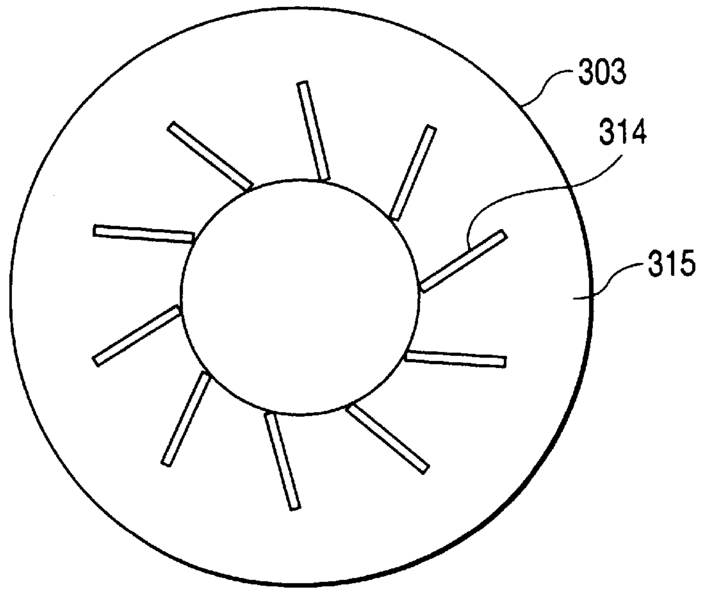
FIG. 22 is a schematic view of a fixed blade.

The magnetic toner particles prepared in the same manner as in Example 1 were subjected to surface treatment by using a rotary impact-type pulverizer shown in FIGS. 15 to 17 as a surface treating apparatus. The distributor had a largest diameter of 246 mm, and the rotor 214 had a largest diameter of 242 mm. The rotor 214 was rotated at a revolution of 9000 rpm. The magnetic toner particles were introduced into the apparatus at a rate of 17 kg/hr. A larger supply amount resulted in a sharp rise in temperature in the apparatus to cause the fusing of the toner particles in the apparatus.

The surface-treated magnetic toner particles had a weight-averaged diameter of 5.9 $\mu$m (containing particles not larger than 4.00 $\mu$m in 30% by number and containing particles not smaller than 10.01 $\mu$m in 0.2% by volume). SF-1 of 160, SF-2 of 150, a BET specific surface area of 1.42 $m^2/g$ and a two-component triboelectricity of −15.5 mC/kg.

The magnetic toner was prepared from the surface-treated magnetic toner particles in the same manner as in Example 1 and evaluated as in Example 1. The image transfer efficiency was 85% which was inferior to that of the magnetic toner of Example 1. The obtained image had a lot of faulty transfer in the middle of the lines and characters, and remarkable scattering of the toner.

Comparative Example 9

The untreated magnetic toner particles prepared in the same manner as in Example 1 were subjected to surface treatment in a rotary mixing apparatus shown in FIGS. 18 to 22 as a surface treating apparatus. The rotary blade 302 was provided in 15 units and had a diameter of 242 mm, and the gap between the rotary blade 302 and the casing 301 was 24 mm wide. The rotary blade 302 was rotated at a revolution of 9000 rpm. The magnetic toner particles were introduced into the apparatus at a rate of 24 kg/hr. A larger supply amount resulted in a sharp rise in temperature in the apparatus to cause the fusing of the toner particles in the apparatus.

The surface-treated magnetic toner particles had a weight-averaged diameter of 7.0 $\mu$m (containing particles not larger than 4.00 $\mu$m in 18% by number and containing particles not smaller than 10.01 $\mu$m in 0.6% by volume), SF-1 of 156, SF-2 of 145, which means insufficient surface treatment, a BET specific surface area of 1.61 $m^2/g$ and a two-component triboelectricity of −13.3 mC/kg.

The magnetic toner was prepared from the surface-treated magnetic toner particles in the same manner as in Example 1 and evaluated as in Example 1. The image transfer efficiency was 81% which was inferior to that of the magnetic toner in Example 1. The obtained image had a lot of faulty transfer in the middle of the images and characters, and considerable scattering of the toner.

EXAMPLE 8

Spherical particles of nylon 12 (weight-averaged particle size: 6.0 $\mu$m) were employed as solid mother particles, and fine particles of titanium dioxide (number-averaged particle size: 0.3 $\mu$m) were employed as solid daughter particles. The solid mother particles of nylon 12 and the solid daughter particles of titanium dioxide were mixed in a Henschel mixer (manufactured by Mitsui-Miike Kakoki Co.) in a ratio of 7:3 to adhere the solid daughter particles onto the surface of the solid mother particles.

The mixture thus obtained was subjected to surface treatment in the system shown in FIG. 1 having the vertical treating apparatus set as in Example 1. In this operation, the mixture was introduced into the vibration feeder 15 through the hopper 32 at a rate of 12 kg/hr. The rotors were rotated at a revolution of 9500 rpm.

When introducing the mixture, the blower 24 was operated to suck the air from the cylindrical treating chambers in an amount which was somewhat larger than the amount of air flow generated by the rotation of the blades 9*a*–9*d*, and the collection was made by the cyclone 20. The introduced magnetic toner particles were surface-treated and collected for a time period of 20 seconds or less.

The observation of the powder thus surface-treated with a scanning electron microscope revealed that the fine particles of titanium dioxide were uniformly and firmly implanted on the entire surface of the spherical particles of nylon 12.

EXAMPLE 9

Spherical particles of polystyrene (Tg: 95° C.; weight-averaged particle size: 15.0 $\mu$m) were employed as solid mother particles, and fine particles of polymethyl methacrylate (PMMA; Tg: 85° C.; number averaged particle size: 0.4 $\mu$m) were employed as solid daughter particles. Polystyrene and PMMA were mixed in a Henschel mixer (manufactured by Mitsui-Miike Kakoki Co.) in a ratio of 9:1 to adhere the solid daughter particles onto the surface of the solid mother particles.

The mixture thus obtained was subjected to surface treatment in the system shown in FIG. 1 having the vertical treating apparatus set as in Example 1. In this operation, the mixture was introduced into the vibration feeder 15 through the hopper 32 at a rate of 10 kg/hr. The rotors were rotated at a revolution of 8800 rpm, and the temperature in the apparatus was adjusted to 80°0 C.

The observation of the powder thus surface-treated with a scanning electron microscope revealed that PMMA was uniformly and firmly fixed on the entire surface of the spherical particles of polystyrene, whereby encapsulated particles were formed.

What is claimed is:

1. An apparatus for treating surfaces of solid particles, comprising, at least:

a first cylindrical treating chamber; and a rotary shaft and a first rotor having two or more blades on its front face, contained in said first cylindrical treating chamber;

wherein a powder charging aperture for introducing the solid particles into the first cylindrical treating chamber together with gas is provided at the center of a front wall of the first cylindrical treating chamber, opposed to the front face of the first rotor;

a first powder discharging aperture for discharging the treated solid particles is provided at the center of a rear wall of the first cylindrical treating chamber, opposed to the rear face of the first rotor;

the first rotor is connected with the rotary shaft and is rotated by rotation of the rotary shaft; and a height $H_a$ of the blades, a gap $L_{1a}$ between a tip of each of the blades and the front wall, a largest diameter $R_{1a}$ of the first rotor and a gap $L_{2a}$ between the blades and a sidewall of the first cylindrical treating chamber satisfy the following conditions:

$$0.1 \leqq L_{1a}/H_a \leqq 5.0,\ 50\times10^{-3} \leqq H_a/R_{1a} \leqq 400\times10^{-3} \text{ and } 1.0\times10^{-3} \leqq L_{2a}/R_{1a} \leqq 95\times10^{-3}.$$

2. An apparatus according to claim 1, wherein $H_a$ is within a range from 10.0 to 500.0 mm, $L_{1a}$ is within a range from 1 to 300, $R_{1a}$ is within a range from 100 to 2000 mm, and $L_{2a}$ is within a range from 0.5 to 20.0 mm.

3. An apparatus according to claim 1, wherein $H_a$ is within a range from 20.0 to 400.0 mm, $L_{1a}$ is within a range from 5 to 200 mm, $R_{1a}$ is within a range from 150 to 1000 mm, and $L_{2a}$ is within a range from 1.0 to 15.0 mm.

4. An apparatus according to claim 1, wherein the first rotor is provided with 2 to 32 blades.

5. An apparatus according to claim 1, wherein the first rotor is provided with 4 to 16 blades.

6. An apparatus according to claim 1, wherein an internal volume $V_a$ of the first cylindrical treating chamber is within a range from $1\times10^3$ to $4\times10^6$ $cm^3$, an area $S_a$ of each of the blades is within a range from 10 to 300 $cm^2$ and a half-value width $W_a$ of each of the blades is within a range from 10 to 300 mm.

7. An apparatus according to claim 1, wherein the powder charging aperture has a largest diameter $R_5$ within a range from 50 to 500 mm, the first powder discharging aperture has a largest diameter $R_{3a}$ within a range from 50 to 500 mm, and a boss portion of the first rotor has a largest diameter $R_{2a}$ within a range from 30 to 450 mm.

8. An apparatus according to claim 1, wherein the first cylindrical treating chamber has a largest diameter $R_{4a}$ with a range from 100.5 to 2020.0 mm.

9. An apparatus according to claim 1, wherein the gap $L_{3a}$ between the rear face of the first rotor and the first rear wall is within a range from 1.0 to 30.0 mm.

10. An apparatus according to claim 1, wherein $R_{1a}$ and $R_{3a}$ satisfy the following conditions:

$$0.2 \leqq R_{3a}/R_{1a} \leqq 0.9.$$

11. An apparatus according to claim 1, wherein $R_{1a}$, $R_{2a}$ and $R_{3a}$ satisfy the following conditions:

$$0.01 \leqq (R_{3a}-R_{2a})/R_{1a} \leqq 0.35.$$

12. An apparatus according to claim 1, wherein $H_a$ is larger than $W_a$.

13. An apparatus according to claim 12, wherein $H_a$ is 1.1 to 2.0 times as large as $W_a$.

14. An apparatus according to claim 13, wherein two or more cylindrical treating chambers each having a rotary shaft and a rotor having two or more blades on its front face, are provided while communicating each other.

15. An apparatus according to claim 14, wherein the powder discharging aperture of the first cylindrical treating chamber constitutes a powder charging aperture of a second cylindrical treating chamber for introducing the solid particles treated in the first cylindrical treating chamber.

16. An apparatus according to claim 14, wherein the cylindrical treating chambers are provided in a number of 2 to 10.

17. An apparatus according to claim 14, wherein the cylindrical treating chambers are provided in a number of 3 to 10.

18. An apparatus according to claim 14, wherein the two or more cylindrical treating chambers have a common rotary shaft.

19. An apparatus according to claim 14, further comprising a second cylindrical treating chamber and a second rotor included in the second cylindrical treating chamber and provided with two or more blades on its front face:

wherein a height $Hb$ of the blades, a gap $L_{1b}$ between a tip of each of the blades and the front wall, a largest diameter $R_{1b}$ of the second rotor and a gap $L_{2b}$ between the blades and a sidewall of the second cylindrical treating chamber satisfy the following conditions:

$$0.1 \leqq L_{1b}/H_b \leqq 5.0,\ 50\times10^{-3} \leqq H_b/R_{1b} \leqq 400\times10^{-3} \text{ and } 1.0\times10^{-3} \leqq L_{2b}/R_{1b} \leqq 95\times10^{-3}.$$

20. An apparatus according to claim 19, wherein $H_b$ is within a range from 10.0 to 500.0 mm, $L_{1b}$ is within a range from 1 to 300, $R_{1b}$ is within a range from 100 to 2000 mm, and $L_{2b}$ is within a range from 0.5 to 20.0 mm.

21. An apparatus according to claim 19, wherein $H_b$ is within a range from 20.0 to 400.0 mm, $L_{1b}$ is within a range from 5 to 200 mm, $R_{1b}$ is within a range from 150 to 1000 mm, and $L_{2b}$ is within a range from 1.0 to 15.0 mm.

22. An apparatus according to claim 14, wherein the second rotor is provided with 2 to 32 blades.

23. An apparatus according to claim 14, wherein the second rotor is provided with 4 to 16 blades.

24. An apparatus according to claim 14, wherein an internal volume $V_b$ of the second cylindrical treating chamber is within a range from $1\times10^3$ to $4\times10^6$ $cm^3$, an area $S_b$ of each of the blades is within a range from 10 to 300 $cm^2$ and a half-value width $W_b$ of each of the blades is within a range from 10 to 300 mm.

25. An apparatus according to claim 14, wherein the powder charging aperture has a largest diameter $R_{3a}$ within a range from 50 to 500 mm, and a boss portion of the second rotor has a largest diameter $R_{2b}$ within a range from 30 to 450 mm.

26. An apparatus according to claim 14, wherein the second cylindrical treating chamber has a largest diameter $R_4b$ within a range from 100.5 to 2020 mm.

27. An apparatus according to claim 14, wherein the gap $L_{3b}$ between the rear face of the second rotor and the second rear wall is within a range from 1.0 to 30.0 mm.

28. An apparatus according to claim 14, wherein $R_{1b}$ and $R_{3b}$ satisfy the following conditions:

$$0.2 \leqq R_{3b}/R_{1b} \leqq 0.9.$$

29. An apparatus according to claim 14, wherein $R_{1b}$, $R_{2b}$ and $R_{3b}$ satisfy the following conditions:

$$0.01 \leqq (R_{3b}-R_{2b})/R_{1b} \leqq 0.35.$$

30. An apparatus according to claim 14, wherein $H_b$ is larger than $W_b$.

31. An apparatus according to claim 30, wherein $H_b$ is 1.1 to 2.0 times as large as $W_b$.

32. A method for treating surfaces of solid particles, comprising the steps of:

using a surface treating apparatus which comprises, at least:

a first cylindrical treating chamber; and a rotary shaft and a first rotor having two or more blades on its front face, contained in the first cylindrical treating chamber;

wherein a height $H_a$ of the blades, a gap $L_{1a}$ between a tip of each of the blades and the front wall, a largest diameter $R_{1a}$ of the first rotor and a gap $L_{2a}$ between the blades and a sidewall of the first cylindrical treating chamber satisfy the following conditions:

$$0.1 \leqq L_{1a}/H_a \leqq 5.0,\ 50\times10^{-3} \leqq H_a/R_{1a} \leqq 400\times10^{-3} \text{ and } 1.0\times10^{-3} \leqq L_{2a}/R_{1a} \leqq 95\times10^{-3};$$

rotating the first rotor by driving the rotary shaft;

introducing the solid particles together with gas into the first cylindrical treating chamber through a powder charging aperture provided at the center of a front wall of the first cylindrical treating chamber;

treating the surface of the solid particles by applying mechanical impact force thereto while retaining the solid particles in the first cylindrical treating chamber; and discharging the treated solid particles from a powder discharging aperture provided at the center of a rear wall of the first cylindrical treating chamber opposed to the rear face of the first rotor.

33. A method according to claim 32, wherein the mechanical impact force is applied to the solid particles when they are passed through the gap between the blades and the sidewall of the first cylindrical treating chamber.

34. A method according to claim 32, wherein the rotor is so rotated that an outermost peripheral speed is 10 to 200 m/sec.

35. A method according to claim 34, wherein the rotor is so rotated that the outermost peripheral speed is 50 to 150 m/sec.

36. A method according to claim 32, wherein the rotor is rotated at a revolution within a range of 90 to 40,000 rpm.

37. A method according to claim 36, wherein the rotor is rotated at a revolution within a range of 900 to 20,000 rpm.

38. A method according to claim 32, wherein the solid particles have a weight-averaged particle size within a range from 2.5 to 20 $\mu$m.

39. A method according to claim 38, wherein the solid particles have a weight-averaged particle size within a range from 3.0 to 15 $\mu$m.

40. A method according to claim 32, wherein the solid particles prior to introduction into the surface treating apparatus have a shape factor SF-1 within a range from 150 to 180 and a shape factor SF-2 within a range from 140 to 160; the treated solid particles discharged from the surface treating apparatus have a shape factor SF-1 within a range from 130 to 160 and a shape factor SF-2 within a range from 110 to 150; and the shape factor SF-1 of the solid particles after the treatment is reduced by 20 or more as compared with the factor prior to the treatment, and the shape factor SF-2 of the solid particles after the treatment is reduced by 10 or more as compared with the factor prior to the treatment.

41. A method according to claim 32, wherein $H_a$ is within a range from 10.0 to 500.0 mm, $L_{1a}$ is within a range from 1 to 300, $R_{1a}$ is within a range from 100 to 2000 mm, and $L_{2a}$ is within a range from 0.5 to 20.0 mm.

42. A method according to claim 32, wherein two or more cylindrical treating chambers each having a rotary shaft and a rotor having two or more blades on its front face, are provided while communicating each other.

43. A method according to claim 32, wherein the powder discharging aperture of the first cylindrical treating chamber constitutes a powder charging aperture of a second cylindrical treating chamber for introducing the solid particles treated in the first cylindrical treating chamber, and the solid particles treated in the first cylindrical treating chamber are further subjected to surface treatment by a mechanical impact force in the second cylindrical treating chamber.

44. A method according to claim 42, wherein the cylindrical treating chambers are provided in a number of 2 to 10.

45. A method according to claim 42, wherein the two or more cylindrical treating chambers include a common rotary shaft.

46. A method according to claim 42, wherein the surface treating apparatus is further provided with a second cylindrical treating chamber and a second rotor included in the second cylindrical treating chamber and provided with two or more blades on its front face, wherein a height $H_b$ of the blades, a gap $L_{1b}$ between a tip of each of the blades and the front wall, a largest diameter $R_{1b}$ of the second rotor and a gap $L_{2b}$ between the blades and a sidewall of the second cylindrical treating chamber satisfy the following conditions:

$$0.1 \leqq L_{1b}/H_b \leqq 5.0,\ 50\times10^{-3} \leqq H_b/R_{1b} \leqq 400\times10^{-3} \text{ and } 1.0\times10^{-3} \leqq L_{2b}/R_{1b} \leqq 95\times10^{-3}.$$

47. A method for treating surfaces of solid particles, in which a surface treating apparatus is used to adhere and/or fix onto surfaces of solid mother particles solid daughter particles smaller than the solid mother particles, wherein the surface treating apparatus comprises, at least:

a first cylindrical treating chamber; and a rotary shaft and a first rotor having two or more blades on its front face, contained in the first cylindrical treating chamber;

wherein a height $H_a$ of the blades, a gap $L_{1a}$ between a tip of each of the blades and a front wall, a largest diameter $R_{1a}$ of the first rotor and a gap $L_{2a}$ between the blades and a sidewall of the first cylindrical treating chamber satisfy the following conditions:

$$0.1 \leqq L_{1a}/H_a \leqq 5.0,\ 50\times10^{-3} \leqq H_a/R_{1a} \leqq 400\times10^{-3} \text{ and } 1.0\times10^{-3} \leqq L_{2a}/R_{1a} \leqq 95\times10^{-3};$$

rotating the first rotor by driving the rotary shaft;

introducing the solid mother particles and the solid daughter particles together with gas into the first cylindrical treating chamber through a powder charging aperture provided at the center of a front wall of the first cylindrical treating chamber;

adhering and/or fixing the solid daughter particles onto the surfaces of the solid mother particles by applying mechanical impact force thereto while retaining the solid matrix particles and the solid daughter particles in the first cylindrical treating chamber; and discharging the treated solid matrix particles from a powder discharging aperture provided at the center of a first rear wall of the first cylindrical treating chamber opposed to the rear face of the first rotor.

48. A method according to claim 47, wherein the mechanical impact force is applied to the solid particles when they are passed through a gap between the blades and the sidewall of the first cylindrical treating chamber.

49. A method according to claim 47, wherein the rotor is so rotated that the outermost peripheral speed is 10 to 200 m/sec.

50. A method according to claim 49, wherein the rotor is so rotated that the outermost peripheral speed is 50 to 150 m/sec.

51. A method according to claim 47, wherein the rotor is rotated at a revolution within a range of 90 to 40,000 rpm.

52. A method according to claim 51, wherein the rotor is rotated at a revolution within a range of 900 to 20,000 rpm.

53. A method according to claim 47, wherein the solid matrix particles have a weight-averaged particle size within a range from 2.5 to 20 $\mu$m.

54. A method according to claim 53, wherein the solid matrix particles have a weight-averaged particle size within a range from 3.0 to 15 $\mu$m.

55. A method according to claim 47, wherein two or more cylindrical treating chambers each having a rotary shaft and a rotor having two or more blades on its front face, are provided while communicating each other.

56. A method according to claim 47, wherein the powder discharging aperture of the first cylindrical treating chamber constitutes a powder charging aperture of a second cylindrical treating chamber for introducing the solid mother particles and the solid daughter particles treated in the first cylindrical treating chamber, and the solid mother particles treated in the first cylindrical treating chamber are further subjected to surface treatment by a mechanical impact force in the second cylindrical treating chamber.

57. A method according to claim 55, wherein the cylindrical treating chambers are provided in a number of 2 to 10.

58. A method according to claim 55, wherein the plural cylindrical treating chambers have a common rotary shaft.

59. A method according to claim 55, wherein the surface treating apparatus is further provided with a second cylindrical treating chamber and a second rotor included in the second cylindrical treating chamber and provided with plural blades on a front face:

wherein a height $H_b$ of the blades, a gap $L_{1b}$ between a tip of each of the blades and the front wall, a largest diameter $R_{1b}$ of the second rotor and a gap $L_{2b}$ between the blades and a sidewall of the second cylindrical treating chamber satisfy the following conditions:

$$0.1 \leqq L_{1b}/H_b \leqq 5.0,\ 50\times10^{-3} \leqq H_b/R_{1b} \leqq 400\times10^{-3} \text{ and } 1.0\times10^{-3} \leqq L_{2b}/R_{1b} \leqq 95\times10^{-3}.$$

60. A method for treating the surface of solid particles, in which a surface treating apparatus is used to adhere and/or fix onto surfaces of solid mother particles thermoplastic solid daughter particles smaller than the solid mother particles, thereby forming films derived from the solid daughter particles on the surface of the solid mother particles, wherein the surface treating apparatus comprises at least:

a first cylindrical treating chamber; and a rotary shaft and a first rotor having two or more blades on its front face, contained in the first cylindrical treating chamber;

wherein a height $H_a$ of the blades, a gap $L_{1a}$ between a tip of each the blades and a front wall, a largest diameter $R_{1a}$ of the first rotor and a gap $L_{2a}$ between the blades and a sidewall of the first cylindrical treating chamber satisfy the following conditions:

$$0.1 \leqq L_{1a}/H_a \leqq 5.0,\ 50\times10^{-3} \leqq H_a/R_{1a} \leqq 400\times10^{-3} \text{ and } 1.0\times10^{-3} \leqq L_{2a}/R_{1a} \leqq 95\times10^{-3};$$

rotating the first rotor by driving the rotary shaft;

introducing the solid mother particles and the solid daughter particles together with gas into the first cylindrical treating chamber through a powder charging aperture provided at the center of a front wall of the first cylindrical treating chamber;

applying mechanical impact force and heat to the solid mother particles and the solid daughter particles while retaining the solid mother particles and the solid daughter particles in the first cylindrical treating chamber, thereby crushing the solid daughter particles and forming films derived therefrom on the surfaces of the solid mother particles; and discharging the treated solid matrix particles from a powder discharging aperture provided at the center of a first rear wall of the first cylindrical treating chamber opposed to the rear face of the first rotor.

61. A method according to claim 60, wherein the mechanical impact force is applied to the solid mother particles and the solid daughter particles when they are passed through a gap between the blades and the sidewall of the first cylindrical treating chamber.

62. A method according to claim 60, wherein the rotor is so rotated that the outermost peripheral speed is 10 to 200 m/sec.

63. A method according to claim 60, wherein the rotor is so rotated that the outermost peripheral speed is 50 to 150 m/sec.

64. A method according to claim 60, wherein the rotor is rotated at a revolution within a range of 90 to 40,000 rpm.

65. A method according to claim 66, wherein the rotor is rotated at a revolution within a range of 900 to 20,000 rpm.

66. A method according to claim 60, wherein the solid mother particles have a weight-averaged particle size within a range from 2.5 to 20 $\mu$m.

67. A method according to claim 66, wherein the solid mother particles have a weight-averaged particle size within a range from 3.0 to 15 $\mu$m.

68. A method according to claim 60, wherein two or more cylindrical treating chambers each having a rotary shaft and a rotor having two or more blades on a front face thereof, are provided while communicating each other.

69. A method according to claim 68, wherein the cylindrical treating chambers are provided in a number of 2 to 10.

70. A method according to claim 68, wherein the plural cylindrical treating chambers have a common rotary shaft.

71. A method according to claim 68, wherein the surface treating apparatus is further provided with a second cylindrical treating chamber and a second rotor included in the second cylindrical treating chamber and provided with two or more blades on a front face:

wherein a height $H_b$ of the blades, a gap $L_{1b}$ between a tip of each of the blades and the front wall, a largest diameter $R_{1b}$ of the second rotor and a gap $L_{2b}$ between the blades and the a sidewall of the second cylindrical treating chamber satisfy the following conditions:

$$0.1 \leqq L_{1b}/H_b \leqq 5.0,\ 50\times10^{-3} \leqq H_b/R_{1b} \leqq 400\times10^{-3} \text{ and } 1.0\times10^{-3} \leqq L_{2b}/R_{1b} \leqq 95\times10^{-3}.$$

72. A method according to claim 60, wherein the powder discharging aperture of the first cylindrical treating chamber constitutes a powder charging aperture of a second cylindrical treating chamber for introducing the solid mother particles and the solid daughter particles treated in the first cylindrical treating chamber, and the solid mother particles treated in the first cylindrical chamber are further subjected to surface treatment by a mechanical impact force in the second cylindrical treating chamber.

73. A method for producing toner, in which a surface treating apparatus is used to treat surfaces of solid toner particles containing at least a binder resin and a coloring material, producing a toner from the treated solid toner particles, wherein the surface treating apparatus comprises, at least:

a first cylindrical treating chamber; and a rotary shaft and a first rotor having two or more blades at the front face thereof, contained in the first cylindrical treating chamber;

wherein a height $H_a$ of the blades, a gap $L_{1a}$ between a tip of each of the blades and a front wall, a largest diameter $R_{1a}$ of the first rotor and a gap $L_{2a}$ between the blades and a sidewall of the first cylindrical treating chamber satisfy the following conditions:

$$0.1 \leqq L_{1a}/H_a \leqq 5.0,\ 50\times10^{-3} \leqq H_a/R_{1a} \leqq 400\times10^{-3} \text{ and } 1.0\times10^{-3} \leqq L_{2a}/R_{1a} \leqq 95\times10^{-3};$$

rotating the first rotor by driving the rotary shaft;

introducing the solid toner particles together with gas into the first cylindrical treating chamber through a powder charging aperture provided at the center of a front wall of the first cylindrical treating chamber;

treating the surface of the solid toner particles by applying mechanical impact force thereto while retaining the solid toner particles in the first cylindrical treating chamber; and discharging the treated solid toner particles from a first powder discharging aperture provided at the center of a first rear wall of the first cylindrical treating chamber opposed to the rear face of the first rotor.

74. A method according to claim 73, wherein the mechanical impact force is given to the solid toner particles at the passage thereof through a gap between the blades and the lateral wall of the first cylindrical treating chamber.

75. A method according to claim 73, wherein the rotor is so rotated that the outermost peripheral speed becomes 10 to 200 m/sec.

76. A method according to claim 73, wherein the rotor is so rotated that the outermost peripheral speed becomes 50 to 150 m/sec.

77. A method according to claim 73, wherein the rotor is rotated at a revolution within a range of 90 to 40,000 rpm.

78. A method according to claim 77, wherein the rotor is rotated at a revolution within a range of 900 to 20,000 rpm.

79. A method according to claim 73, wherein the solid toner particles have a weight-averaged particle size within a range from 2.5 to 20 $\mu$m.

80. A method according to claim 79, wherein the solid toner particles have a weight-averaged particle size within a range from 3.0 to 15 $\mu$m.

81. A method according to claim 73, wherein the solid toner particles prior to the introduction into the surface treating apparatus have a shape factor SF-1 within a range from 150 to 180 and a shape factor SF-2 within a range from 140 to 160; the treated solid toner particles discharged from the surface treating apparatus have a shape factor SF-1 within a range from 130 to 160 and a shape factor SF-2 within a range from 110 to 150; and the shape factor SF-1 of the solid particles after the treatment is reduced by 20 or more as compared with the factor prior to the treatment and the shape factor SF-2 of the solid particles after the treatment is reduced by 10 or more as compared with the factor prior to the treatment.

82. A method according to claim 73, wherein $H_a$ is within a range from 10.0 to 500.0 mm, $L_1$a is within a range from 1 to 300, $R_{1a}$ is within a range from 100 to 2000 mm, and $L_{2a}$ is within a range from 0.5 to 20.0 mm.

83. A method according to claim 73, wherein two or more cylindrical treating chambers each having a rotary shaft and a rotor having two or more blades on its front face, are provided while communicating each other.

84. A method according to claim 83, wherein the cylindrical treating chambers are provided in a number of 2 to 10.

85. A method according to claim 83, wherein the plural cylindrical treating chambers have a common rotary shaft.

86. A method according to claim 73, wherein the powder discharging aperture of the first cylindrical treating chamber constitutes a powder charging aperture of a second cylindrical treating chamber for introducing the solid toner particles treated in the first cylindrical treating chamber, and the solid toner particles treated in the first cylindrical chamber are further subjected to surface treatment by a mechanical impact force in the second cylindrical treating chamber.

87. A method according to claim 73, wherein the surface treating apparatus is further provided with a second cylindrical treating chamber and a second rotor included in the second cylindrical treating chamber and provided with plural blades on its front face, wherein a height $H_b$ of the blades, a gap $L_{1b}$ between a tip of each of the blades and the front wall, a largest diameter $R_{1b}$ of the second rotor and a gap $L_{2b}$ between the blades and a sidewall of the second cylindrical treating chamber satisfy the following conditions:

$$0.1 \leqq L_{1b}/H_b \leqq 5.0,\ 50\times10^{-3} \leqq H_b/R_{1b} \leqq 400\times10^{-3} \text{ and } 1.0\times10^{-3} \leqq L_{2b}/R_{1b} \leqq 95\times10^{-3}.$$

88. A method according to claim 73, wherein the treated solid toner particles have a volume-averaged particle size within a range from 2.5 to 6.0 $\mu$m.

* * * * *

UNITED STATES PATENT AND TRADEMARK OFFICE
CERTIFICATE OF CORRECTION

PATENT NO. : 5,865,381

DATED : February 2, 1999

INVENTOR(S) : SATOSHI MITSUMURA ET AL.

It is certified that error appears in the above-identified patent and that said Letters Patent is hereby corrected as shown below:

COLUMN 10

Line 30, "$L_2a$" should read --$L_{2a}$--;
Line 49, "$L_2a$" should read --$L_{2a}$--; and
Line 55, "an" should be deleted.

COLUMN 12

Line 20, "Hb" should read --$H_b$--;
Line 40, "Hb" should read --$H_b$--; and
Line 53, "Hb" should read --$H_b$--.

COLUMN 14

Line 16, "know" should read --known--; and
Line 57, "compound" should read --compounds--.

COLUMN 19

Line 4, "an" should read --a--; and "rod 505," should read --rod 541,--.
Line 18, "resin 100" should read --resin 100--;
Line 20, "material 100" should read --material 100--;
Line 21, "agent 2" should read --agent 2--; and
Line 25, "(wax) 4 parts by weight were" should read --(wax) 4 parts by weight were--.

COLUMN 20

Line 26, "$V_{dc=-}$ 500V" should read --$V_{dc}$ = -500V--; and
Line 27, "$V_{p-p=}$ 1200V" should read --$V_{p-p}$ = 1200V--.

UNITED STATES PATENT AND TRADEMARK OFFICE
CERTIFICATE OF CORRECTION

PATENT NO. : 5,865,381

DATED : February 2, 1999

INVENTOR(S) : SATOSHI MITSUMURA ET AL.

It is certified that error appears in the above-identified patent and that said Letters Patent is hereby corrected as shown below:

COLUMN 22

Line 11, "(wax) 4 parts by weight were" should read --(wax)         4 parts by weight         were--.

COLUMN 23

Line 17, "of" should be deleted.

COLUMN 24

Line 3, "$L_2a/R_{1a}$" should read --$L_{2a}/R_{1a}$--.

COLUMN 30

Line 49, "80°OC." should read --80°C.--

COLUMN 31

Line 17, "300," should read --300 mm,--.

COLUMN 32

Line 13, "face:" should read --face,--;
Line 14, "H*b*" should read --$H_b$--;
Line 24, "300," should read --300 mm,--; and
Line 47, "$R_4b$" should read --$R_{4b}$--; and "2020 mm" should read --2020.0 mm--.

COLUMN 33

Line 60, "300," should read --300 mm,--.

UNITED STATES PATENT AND TRADEMARK OFFICE

CERTIFICATE OF CORRECTION

PATENT NO. : 5,865,381

DATED : February 2, 1999

INVENTOR(S) : SATOSHI MITSUMURA ET AL.

It is certified that error appears in the above-identified patent and that said Letters Patent is hereby corrected as shown below:

COLUMN 35

Line 32, "face:" should read --face,--.

COLUMN 36

Line 44, "face:" should read --face,--.

COLUMN 38

Line 12, "$L_1a$" should read --$L_{1a}$--; and
Line 13, "300," should read --300 mm,--.

Signed and Sealed this

Eighteenth Day of January, 2000

Attest:

Q. TODD DICKINSON

*Attesting Officer*

*Commissioner of Patents and Trademarks*